United States Patent [19]

Kataoka et al.

[11] Patent Number: 6,077,472
[45] Date of Patent: Jun. 20, 2000

[54] DULL-SURFACED, INJECTION MOLDED SYNTHETIC RESIN ARTICLES AND A METHOD OF SHAPING THEM

[75] Inventors: Hiroshi Kataoka, Tokyo; Yuo Umei, Kanagawa, both of Japan

[73] Assignee: Asahi Kasei Kogyo Kabushiki Kaisha, Osaka, Japan

[21] Appl. No.: 08/750,740

[22] PCT Filed: Jun. 21, 1995

[86] PCT No.: PCT/JP95/01241

§ 371 Date: Dec. 20, 1996

§ 102(e) Date: Dec. 20, 1996

[87] PCT Pub. No.: WO95/35194

PCT Pub. Date: Dec. 28, 1995

[30] Foreign Application Priority Data

Jun. 22, 1994 [JP] Japan ................................. 6-139926

[51] Int. Cl.[7] .......................................................... B28B 7/36
[52] U.S. Cl. .......................... 264/338; 428/141; 264/219; 264/327; 264/328.16; 264/299; 264/225; 264/226
[58] Field of Search .............................. 428/141; 264/219, 264/327, 328.16, 299, 338, 225, 226

[56] References Cited

U.S. PATENT DOCUMENTS

| | | | |
|---|---|---|---|
| 3,544,518 | 12/1970 | Bodkins et al. | 264/54 |
| 4,919,388 | 4/1990 | Koike et al. | 249/115 |
| 5,639,536 | 6/1997 | Yamazaki et al. | 428/141 |
| 5,653,932 | 7/1994 | Aida et al. | 264/219 |
| 5,662,977 | 9/1997 | Spain et al. | 428/141 |
| 5,705,254 | 1/1998 | Morinaga et al. | 428/141 |

FOREIGN PATENT DOCUMENTS 6-143322  5/1994  Japan .

*Primary Examiner*—William P. Watkins, III
*Attorney, Agent, or Firm*—Birch, Stewart, Kolasch & Birch

[57] ABSTRACT

The purpose of the invention is to produce a shaped article having a uniform dull surface with less noticeable weld line and other surface detects. The injection molded synthetic resin article of the invention has a weld portion and is characterized in that the weld line on the surface of the injection molded article has a dent of no more than 2 $\mu$m, the surface of the injection molded article is a dull surface with no more than 30% gloss, the general portion, the weld portion and the resin flow end portion of the surface of the injection molded article provide a uniform dull surface, said dull surface having such abrasion resistance that no visible flaws develops at a hardness of 2B and below in a pencil scratch test. Such molded article can be produced without post-molding paint application and yet it has practical utility, thus presenting a maximum economic advantage.

7 Claims, 16 Drawing Sheets

TEMPERATURE CHANGES OF RESIN SURFACE
NUMERAL ON EACH CURVE REPRESENTS
THICKNESS OF Ni LAYER

EFFECT OF THICKNESS OF Ni LAYER (PI = 0.15mm)

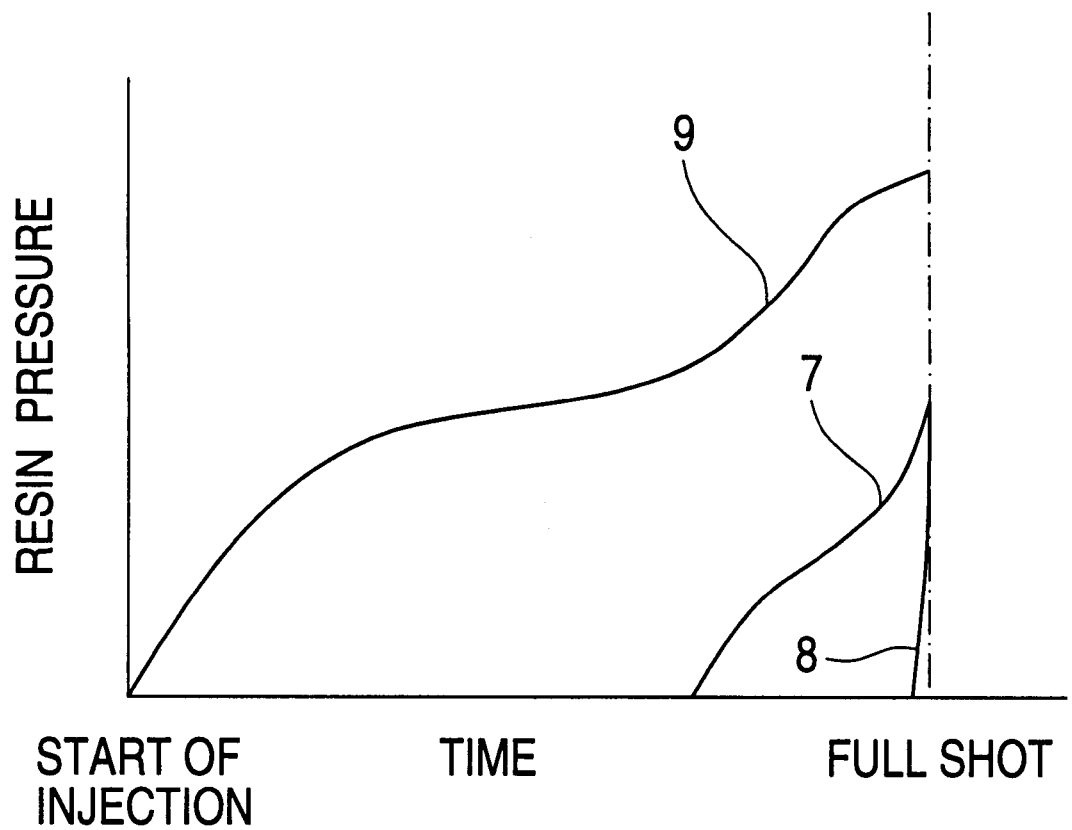

FIG. 13-A 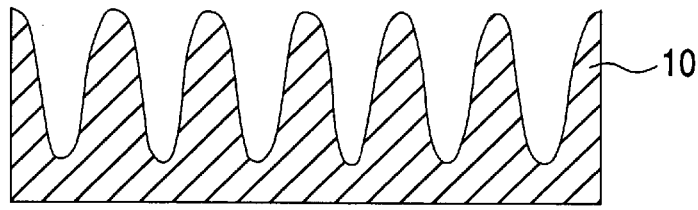
FIG. 13-B 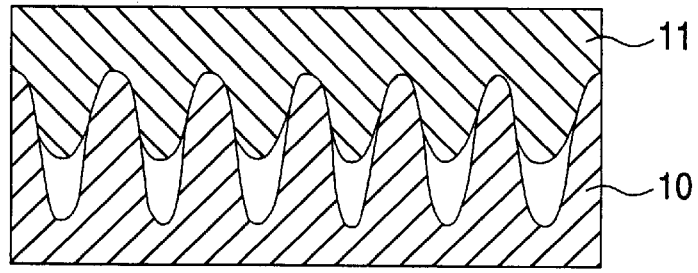
FIG. 13-C 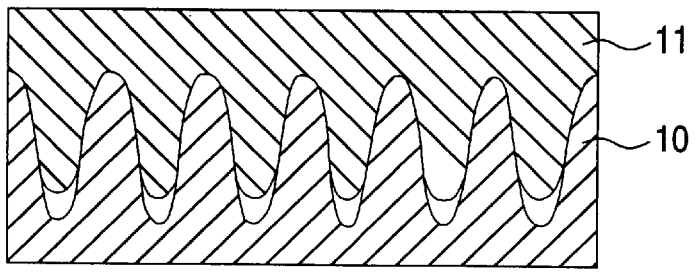
FIG. 13-D 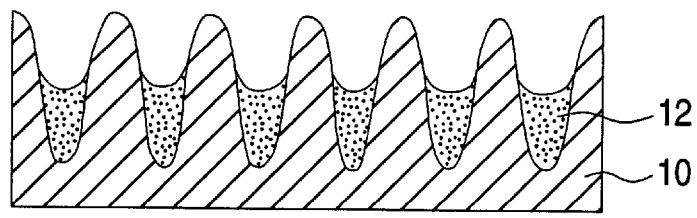

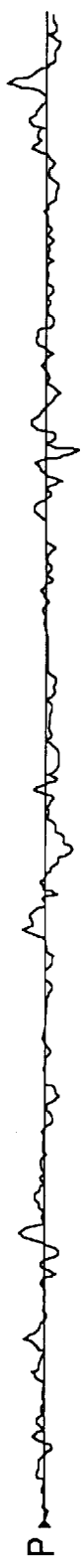
FIG. 16-A
FIG. 16-B
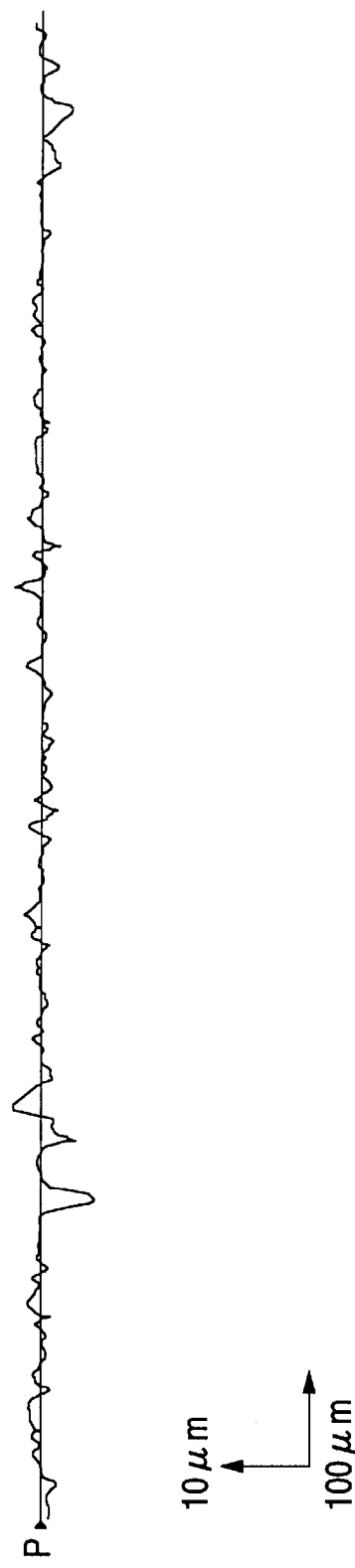
FIG. 16-C

*FIG. 17-A*
*FIG. 17-B*
*FIG. 17-C*
10 μm
100 μm

DULL-SURFACED, INJECTION MOLDED SYNTHETIC RESIN ARTICLES AND A METHOD OF SHAPING THEM

TECHNICAL FIELD

This invention relates to injection molded synthetic resin articles having a dull surface and a method of shaping them.

BACKGROUND ART

Injection molded resin synthetic articles having a dull surface are generally produced by injection molding with metal molds having surfaces with fine asperities. However, several defects have generally been pointed out to exist in the injection moldings obtained by this method, such as the failure to reproduce details of the fine asperities from the mold surfaces and/or noticeable unseemly spots such as weld lines and flow marks and there is a need to make improvements.

One of the practices being employed is to improve these defects in appearance by adopting special molding conditions. While there are a variety of molding conditions to adopt, the greatest effect is exhibited by the mold temperature and the higher the mold temperature, the more preferred. However, at higher mold temperatures, the cooling time required to cool and solidify the plasticized resin is prolonged to lower the molding efficiency.

Under the circumstances, a method is required that achieves good reproduction of the die surfaces without increasing the mold temperature or that permits the mold temperature to be increased without prolonging the required cooling time.

In another method being practiced, a heating and a cooling port are provided in a mold and a heating and a cooling medium are flowed alternately to repeat the heating and cooling of the mold; this method, however, consumes much heat and requires a prolonged cooling time.

A method of providing a better reproduction of mold surfaces by coating the mold cavity defining inner die surfaces with a material having a small heat conductivity is disclosed in the specification of U.S. Pat. No. 3,544,518 with respect to injection molding.

In addition, the specification of U.S. Pat. No. 4,919,388 describes a metal mold having the mold cavity defining inner die surface coated with a heat insulating layer having surface asperities. However, little mention is made of the shape of the surface asperities of the heat insulating layer, the state of the surfaces of the shaped article, the operational and advantageous aspects of the layer, etc.

The object of the present invention is to provide an injection molded article that has a uniform dull surface with a less noticeable weld line and other surface detects and that can be produced with improved efficiency, as well as a method for molding such articles.

The mold surfaces that define the die cavity of a metallic mold have heretofore generally been rendered dull exclusively by a method that roughens the mold surfaces by sandblasting. With molds having the coating of a heat insulating layer, sandblasting may be the first method to try to roughen the die surface of the heat insulating layer to make them dull. We performed injection molding of synthetic resins using an insulating layer coated mold that had the surface sandblasted to a dull state; as a result, it was found that despite the uniform dull state of the die surface, the injection molded articles were not uniformly dull. Stated more specifically, there were not any unseemly weld line dents which would have occurred if molding had been done with common dull-surfaced metal molds; on the other hand, it was found that peculiar defective phenomena occurred noticeably in that the weld and general portions of the injection molded article and/or the general and resin flow end portions produced non uniform dull surfaces and that, in addition, the dull surface of the weld or resin flow end portion would readily sustain a flaw when scratched by nail.

The present invention provides an injection molded article having a superior appearance in that it has accomplished various features such as a less noticeable weld line, uniform dull surface and improved abrasion resistance, as well as a method of molding said article.

DISCLOSURE OF INVENTION

Thus, the present invention provides a dull-surfaced, injection molded synthetic resin article having a weld portion, in which the weld line on the surface of the injection molded article has a dent of no more than 2 μm, the surface of the injection molded article is a dull surface with no more than 30% gloss, the general portion, the weld portion and the resin flow end portion of the surface of the injection molded article provide a uniform dull surface, said dull surface having has such abrasion resistance that no visible flaws develops at a hardness of 2B and below in a pencil scratch test.

The present invention also provides an injection molded article as described above, in which the synthetic resin is a styrenic synthetic resin.

The present invention also provides an injection molded synthetic resin article as described above, in which the weld line has a dent of no more than 1 μm and the gloss is no more than 20%.

The present invention also provides an injection molded synthetic resin article, in which the surface of the injection molded article is embossed to have high and low spots and either said high spots or low spots or both has a dull surface as set forth above.

The present invention also provides an injection molded synthetic resin article as described above, in which the dull-surfaced high spots have such a shape that their area is greater than the area of the specular low spots.

The present invention also provides a method of shaping the above-described molded article by injection molding using a heat insulating layer coated mold which is such that the die surfaces of a metallic main mold that define the die cavity and which are on the surface side of the molded article are coated with a heat insulating layer 0.05 to 1.0 mm thick which is made of a heat-resistant polymer to provide fine asperities on the innermost surface of the die.

The present invention also provides a shaping method as described above, which performs injection molding using a heat insulating layer coated mold in which the fine asperities on the innermost surface of the die have a center-line-average roughness (Ra) of 0.1 to 10 μm, a maximum height (Rmax) of 1 to 100 μm, a ten-point-average roughness (Rz) of 1 to 100 μm and an average spacing between local peaks (S) of 0.01 to 0.5 mm, as measured in accordance with JIS B 0601.

The present invention also provides a shaping method as described above, which performs injection molding using a heat insulating layer coated mold in which the fine asperities on the surface of the heat insulating layer have a center-line-average roughness (Ra) of 0.5 to 5 μm, a maximum height (Rmax) of 5 to 50 μm, a ten-point-average roughness (Rz) of 5 to 50 μm and an average spacing between local peaks (S) of 0.03 to 0.3 mm.

The present invention also provides a shaping method as described above, which performs injection molding using a heat insulating layer coated mold having fine asperities on the surface that are formed by applying a heat insulating material made of a heat-resistant polymer incorporating 5 to 50 wt % of a fine powder onto the surface of the heat insulating layer on the innermost surface of the mold.

The present invention also provides a shaping method as described above, in which the fine powder is a fine powder of inorganic matter having an average particle size of 0.001 to 50 μm.

The present invention also provides a shaping method as described above, in which the inorganic matter is silicon oxide.

The present invention also provides a shaping method as described above, which performs injection molding using a heat insulating layer coated mold having fine asperities on the surface that are formed by sandblasting the surface of the heat insulating layer to provide asperities and then casting a heat-resistant polymer into the low spots in said sandblasted surface to adjust its roughness.

The present invention also provides a shaping method as described above, which performs injection molding with a mold coated with a heat insulating layer which has on its surface a thin metal layer the thickness of which is not greater than a fifth of the thickness of said heat insulating layer and the surface of said thin metal layer having fine asperities as set forth above.

The present invention also provides a shaping method as described above, which performs injection molding using a mold coated with a heat insulating layer which has on its surface a thin metal layer the thickness of which is not greater than a fifth of the thickness of said heat insulating layer, said metal layer being embossed to have high and low spots, and either said high or low spots or both having fine asperities as set forth above.

The present invention also provides a shaping method, which performs injection molding using a mold coated with a heat insulating layer, with the low spots of the embossed surface occupying a greater area than the high spots, and the surfaces of the low spots having fine asperities as set forth above and the surfaces of the high spots being glossy.

The present invention will now be described below in detail.

Synthetic resins that can be used in the invention are thermoplastic resins that may be used in ordinary injection molding practices. For example, they are thermoplastic resins that may be used in ordinary injection molding practices, including polystyrene, rubber-reinforced polystyrene, styrene-acrylonitrile copolymer, blends of polyphenylene ether/styrenic resins, styrenic resins such as styrene-methyl methacrylate copolymer, styrene-acrylonitrile-chlorinated polyethylene copolymer and ABS resin, olefinic resins such as polyethylene and polypropylene, vinyl chloride polymer or copolymers thereof, polycarbonates, polyamides and polyesters. The synthetic resins preferably contain 1 to 60% of resin reinforcements. Exemplary resin reinforcements include various kinds of rubbers, various kinds of fibers such as glass fiber and carbon fiber, and inorganic powders such as talc, calcium carbonate and kaolin.

What can be used with satisfaction are styrenic resins and what can be used with particular satisfaction are rubber-reinforced styrenic resins. The rubber-reinforced synthetic resins mentioned here refer to rubber-reinforced polystyrene, ABS resin, AAS resin, MBS resin and so forth that have a rubber phase distributed as islands in the resin phase. The rubber-reinforced polystyrene is a resin having a rubber phase such as polybutadiene or SBR dispersed as islands in the resin phase made of a styrene-based polymer. The ABS resin is a resin having a rubber phase such as polybutadiene or SBR dispersed as islands in the resin phase made of a styrene/acrylonitrile based copolymer. The AAS resin is a resin having an acrylic rubber phase dispersed as islands in the resin phase made of a styrene/acrylonitrile based copolymer, and the MBS resin is a resin having a rubber dispersed as islands in the resin phase made of a styrene/methyl methacrylate based copolymer. In addition, blends based on these resins may also be used in the invention. For example, a rubber-reinforced polystyrene resin incorporating polyphenylene ether may be used with satisfaction. Injection molded articles of these resins shaped in the invention have an extremely good balance between performance and economy and may be used with advantage as housings of light electrical appliances, electronic machines, office machines, etc., various kinds of daily goods, various kinds of engineering parts, etc.

The injection molded articles of the invention are shaped articles that have flowing resin streams meet and fuse together to form a "weld line" portion during injection molding and they may be a shaped article with a single-point gate or a shaped article with a multiple-point gate. The shaped articles of the invention may be typified by the housings and so forth of electrical appliances, electronic machines, office machines, etc. and these shaped articles are generally molded with a multiple-point gate and shaped articles with a multiple-point gate are particularly preferred. The multiple-point gate as noted here is such that one mold cavity has two or more gates, preferably 2 to 10 gates. Even with a single-point gate, shaped articles that have so many holes as to generate a weld line portion may be encompassed by the invention with satisfaction.

The weld portion of the surface of an injection molded article as set forth herein refers to a region that has the weld line portion in the center. The resin flow end portion refers to the area of a die cavity which is last filled with the injected resin. The general portion refers to the general area of the surface of the shaped article which excludes the weld portion and the resin flow end portion.

The injection molded article of the invention has a dull surface with no more than 30% gloss, preferably no more than 20% gloss, more preferably not higher than 10% gloss, on the shaped article's surface, with the general portion, the weld portion and the resin flow end portion of said shaped article having a uniform dull surface, and with the weld line having a dent of no more than 2 μm, preferably no more than 1.5 μm, more preferably not greater than 1 μm, to make the weld line hardly noticeable. The shaped article of the invention has a uniform dull surface as the whole including the general portion, the weld portion and the resin flow end portion. Gloss measurement is performed in accordance with JIS K 7105 at a reflection angle of 60 degrees. Having a uniform dull surface means that the surface is uniformly dull as observed with the naked eye and it is generally meant that the difference in density on the dull surface is no more than 0.5%, preferably no more than 0.3%, in terms of gloss. The dent of a weld line can be measured by examining a cross section of the weld portion with a microscope. Stated more specifically, a picture is taken of a cross section of an area near the weld line, a tangent is drawn to the surface of the shaped article in said cross-sectional picture and the distance from said tangent to the bottom of the dent of the weld line is measured and designated as the "weld line dent".

Sandblasting is generally used as an exclusive method for making the surface of a mold dull and if injection molding is performed in a common way with a mold coated with a heat insulating layer which has been provided fine asperities on the surface by sandblasting, the gloss of the injection molded article differs between the weld and general portions an/or between the general and resin flow end portions, making it difficult to achieve a uniform dull surface. The present invention is an improvement of this point and provides a shaped article that has a uniform dull surface and which has the dent of a weld reduced to such an extent that the weld line is substantially unnoticeable. In the present invention, the surface of the injection molded article is rendered uniformly dull and the weld line is made unnoticeable, whereby the housings of various kinds of electrical appliances, electronic machines, office machines, etc. which have heretofore been used with coatings being applied to injection molded articles after shaping can be used uncoated.

The dull surface of the injection molded synthetic resin article of the invention has such abrasion resistance that not noticeable flaws develops at a hardness of 2B or below, preferably at a hardness of B or below, in a pencil scratch test. More preferably, it has resistance to the abrasion by nail. The measurement in the pencil scratch test is performed in accordance with JIS K 5401. Noticeable flaws are flaws that can easily be recognized with the naked eye.

The injection molded synthetic resin article of the invention may include those having embossed surfaces such as leather embossing and wood grain embossing. In this case, either the high or low spots of the embossing or both provide a dull surface according to the definition by the invention. If either the high or low spots are rendered to have a dull surface and the other a glossy surface, the embossed shape is clearly noticeable to provide a particularly preferred appearance. A particularly preferred shape is such that the sum of the areas of dull-surfaced high spots is greater than the sum of the areas of glossy low spots.

The metals as the constituent materials of the main mold to be set forth herein include metal molds that are commonly used in the shaping of synthetic resins, such as iron or various iron-based steel materials, aluminum or aluminum-based alloys, zinc alloys such as ZAS, and beryllium-cooper alloys. Steel materials may be used with particular satisfaction.

As the heat-resistant polymer for use in the heat insulating layer in the invention, heat-resistant polymers having a glass transition temperature of at least 100° C., preferably at least 150° C., and/or a melting point of at least 230° C., preferably at least 250° C., may be used with satisfaction. Said heat-resistant polymers are preferably tenacious polymers having an elongation at break of at least 5%, more preferably at least 10%. The method of measuring the elongation at break is in accordance with ASTM D 638 and the stretching rate at measurement is 5 mm/min.

The polymer that can be used with satisfaction as the heat insulating layer in the invention is a heat-resistant polymer having an aromatic ring in the backbone chain and various kinds of noncrystalline heat-resistant polymers, various kinds of polyimides and the cured products of modified epoxy resins as well as mixtures thereof, etc. may be used with satisfaction.

Exemplary noncrystalline heat-resistant polymers include polysulfone, polyether sulfone, polyallylsulfone and polyarylate, with polysulfone and polyether sulfone being used with particular satisfaction.

While various types of polyimides are available, linear high-molecular weight polyimides and partially crosslinked polyimides may be used. Thermoplastic polyimides, polyether imides, polyimides that form an imido ring upon heating after application and so forth may be used with satisfaction. Liner high-molecular weight polyimides have generally high breaking elongation and good durability and, hence, may be used with particular satisfaction.

Injection molding has an economic value in that a shaped article of an intricate shape can be obtained in one molding cycle. In order to coat intricate mold surfaces with a heat-resistant polymer and to ensure strong adhesion, it is the most preferred that a solution of the heat-resistant polymer, a solution of a heat-resistant polymer precursor, a monomer or partially cured product, etc. of the heat-resistant polymer are applied and then heated to form a layer of the heat-resistant polymer. Therefore, the heat-resistant polymer of the invention or the heat-resistant polymer precursor, etc. are preferably such that they can be dissolved in solvents or otherwise processed for conversion to low-viscosity fluids.

Cured epoxy resins, silicon-base resins, melamine-base resins, etc. that have been provided with flexibility may also be used with satisfaction. The cured products of modified epoxy resins that have been provided with flexibility can be used with particular satisfaction. For example, the cured product of a polyamide modified epoxy resin, a polymer alloy composed of the cured product of an epoxy resin/polyether imide blend, a polymer alloy composed of the cured product of an epoxy resin/polyether sulfone blend, etc. may be used with satisfaction.

The thickness of the heat insulating layer is selected appropriately from an extremely narrow range of from 0.05 mm to 1.0 mm. The preferred range is from 0.08 mm to 0.7 mm, more preferably 0.1 to 0.5 mm, most preferably 0.15 to 0.45 mm. The temperature of the main mold is such that it is cooled at a temperature 10° C. below the softening temperature of the synthetic resin to be injection molded, preferably at 80° C. or below, more preferably at 65° C. or below, but not lower than room temperature, for molding purposes.

In injection molding, the mold temperature and the molding cycle time are closely related. Stated more specifically, the relationship between the mold temperature (Td) and the required time of cooling within the mold ($\theta$) is theoretically expressed by the following equation:

$$\theta = -(D2/2\pi\alpha) - 1n[(\pi/4)\{(Tx-Td)/(Tc-Td)\}]$$

$\theta$: cooling time (sec)
D: the maximum wall thickness of the shaped part (cm)
Tc: cylinder temperature (° C.)
Tx: the softening temperature of the shaped part (° C.)
$\alpha$: the thermal diffusivity of the resin
Td: mold temperature (° C.)

The cooling time ($\theta$) is proportional to the square of the wall thickness of the shaped part (D) and is a function of (Tx–Td). Namely, it is a function of the value obtained by subtracting the temperature of the mold from the softening temperature of the synthetic resin. If this value is small, a variation in it causes a substantial variation in the cooling time but as this value increases, a smaller variation is caused to the cooling time.

Coating the main mold with the heat insulating layer works in the same direction as increasing the wall thickness of the shaped part to increase the cooling time; on the other hand, lowering the mold temperature is effective for shortening the cooling time. From the viewpoint of molding cycle time, it is preferred that an improvement in appearance can be achieved with small thickness of the heat insulating layer. For the purposes of the invention, the thickness of the heat insulating layer is in a range of 0.05 to 1.0 mm, preferably 0.08 to 0.7 mm, more preferably 0.1 to 0.5 mm, most preferably within an extremely narrow range of 0.15 to 0.45 mm, which is satisfactory for attaining a balance between improved appearance and molding cycle time.

When the surface of the metallic main mold is coated with the heat insulating layer and if the surface is contacted by an injected hot resin, the temperature of the die surface rises under the heat of the resin. The smaller the thermal conductivity of the heat insulating layer and the thicker the heat insulating layer, the higher the temperature of the die surface.

In the present invention, injection molding is preferably performed with the die surface being held above the softening temperature of the injected synthetic resin during most of the period of at least 0.5 seconds from the time when the injected synthetic resin contacts the die surface cooled below 80° C. In the absence of any heat insulating layer on the die surface, as soon as the synthetic resin contacts the die surface, i.e. within less than 0.1 second, the temperature of the die surface becomes substantially equal to that of the main mold; on the other hand, if the die surface is coated with the heat insulating layer, the die surface can be held hotter than the softening temperature during most of the 0.5-second period.

The change in the die surface temperature during injection molding can be calculated form the temperature, specific heat, thermal conductivity, density, the latent heat of crystallization etc. of the synthetic resin, main mold and the heat insulating layer. For example, the necessary calculation can be made by analysis of non-steady heat conduction using a nonlinear finite element method with ADINA and ADINAT (the software developed by the Massachusetts Institute of Technology), etc.

The innermost surface of the mold having fine asperities as set forth herein is a selected part of a surface having asperities which is generally referred to as a dull surface and this surface provides the injection mold synthetic resin article of the invention which has a uniform dull surface. The surface roughness of the innermost surface of the mold is such that it is selected form the following data: a center-line-average roughness (Ra) of 0.1 to 10 μm, a maximum height (Rmax) of 1 to 100 μm; a ten-point-average roughness (Rz) of 1 to 100 μm, and an average spacing of local peaks (S) of 0.01 to 0.5 mm, as measured in accordance with JIS B 0601. More preferably, the fine surface asperities are selected from the following data: Ra of 0.5 to 5 μm, Rmax of 5 to 50 μm, Rz of 5 to 50 μm, and S of 0.03 to 0.3 mm. For surface roughness measurements, a reference length of 2.5 mm is employed.

The average spacing of local peaks (S) is the average value for the distance between local peaks. If a low spot exists on both sides of a high spot of interest, the top of the high spot is referred to as the local peak. It should, however, be noted that if the distance (taken laterally) between adjacent local peaks is less the 1% of the reference length or if the depth of the low spots on both sides is less than 10% of the maximum height (Rmax), that point is not regarded as the local peak.

If the synthetic resin plasticized upon heating is injected into a cooled metal mold commonly used in injection molding, cooling of the resin immediately starts at the surface where it contacts the inner surface of the die. Immediately thereafter, a solidified layer of said synthetic resin forms on the inner surface of the die growing in thickness with the lapse of time. The thickness of the solidified layer varies with the temperature of the synthetic resin, its softening temperature, its heat conductivity, the latent heat of its crystallization, the temperature of the mold, its heat conductivity, etc. and it is generally held that the solidified layer forms several microseconds to several tens of microseconds after the synthetic resin contacts the mold, getting thicker with the lapse of time. In such general injection molding, it is understood that when the injection pressure required to reproduce the die surface on the synthetic resin is exerted, a thin solidified layer has already formed on the surface of the synthetic resin that contacted the inner surface of the die. In order to ensure that the die surface is reproduced on the synthetic resin effectively in this state, it is necessary to reproduce the mold surface by pressing the resin surface of the thin solidified layer against the inner surface the die and a considerably high pressure must be applied. Therefore, in general injection molding, the die surface is effectively reproduced in areas near the gate where high injection pressure is applied but the reproduction of the die surface is generally poor in the resin flow end portion where low injection pressure is applied.

In contrast, if injection molding is performed using a metal mold having the surface coated with the heat insulating layer, the latter is heated with the injected synthetic resin to have its temperature raised and then cooling starts. The synthetic resin contacting the inner surface of the die coated with a suitable thickness of the heat insulating layer is kept above the softening temperature of the synthetic resin for a period of several hundred microseconds after the contact; in the meantime, no solidified layer forms and the formation of a solidified layer starts thereafter. Therefore, if the mold coated with the heat insulating layer is used, the pressure required to reproduce the die surface on the synthetic resin in contact with the inner surface of the die can be exerted in such a state that the solidified layer is yet to be formed on the die surface. This state can typically be established in the following situations: i.e., the synthetic resin temperature is high; the softening temperature of the synthetic resin is low; the mold temperature is high; the heat insulating layer has an appropriate thickness above a specified level; and a pressure above a specified value is applied to the synthetic as soon as possible after it has contacted the mold. The first three of these items are not freely selectable because of limitations such as the performance required of the shaped article, its production rate and cost and the last two items are preferably selected. If a pressure acting toward the inner surface of the die is applied to the resin in such a state that the solidified layer is yet to be formed on the die surface, the die surface can be reproduced very effectively and, in addition, even if the resin pressure acting upon the inner surface of the die is somewhat low, satisfactory reproduction of the die surface is improved to an even higher level.

In the injection molded article of the invention which has a weld line and which has been shaped with the heat insulating layer coated mold has high pressure applied to the synthetic resin in the weld portion and/or in the resin flow end portion within a short time after the synthetic resin contacts the mold and, as a result, the reproduction of the die surface in the weld portion and/or in the resin flow end portion is significantly improved. On the other hand, in the general portion which excludes the weld and resin flow end portions, pressure is gradually applied to the synthetic resin and, as a result, the weld portion and/or the resin flow end and general portions have a nonuniform appearance. This is a characteristic phenomenon that occurs pronouncedly when the mold coated with the heat insulating layer is used; we discovered this phenomenon in connection with the present invention and it is required to ensure uniformity in the appearance of those portions. The present invention provides a shaped article in which each of the resin flow end portion, the weld portion and the general portion has a uniform appearance.

The present invention also encompasses the case where a thin metal layer exists on the surface of the heat insulating layer. Stated more specifically, the effectiveness of coating the metal mold with the heat insulating layer is retained if the surface of the heat insulating layer is coated with a metal layer considerably thinner than the heat insulating layer. The thickness of the metal layer on the outermost surface must be small enough to retain the effectiveness of the coating of the heat insulating layer and it is generally not more than $\frac{1}{5}$, preferably not more than $\frac{1}{7}$, more preferably between $\frac{1}{7}$ and $\frac{1}{100}$, of the thickness of the heat insulating layer, and the absolute value of the thickness of the metal layer is selected preferably from the range of 1 to 50 $\mu$m, more preferably from the range of 2 to 30 $\mu$m. In the present invention, it is preferred that the surface of the heat insulating layer has a suitable degree of fine asperities, with the surface being overlaid with a thin metal layer reproducing said fine asperities. It should, however, be noted that the invention also encompasses the case where the surface of the heat insulating layer is smooth and overlaid with a thin metal layer having a suitable degree of asperities on the surface. The thickness of the metal layer as set forth herein is represented by the averaged thickness of the metal layer.

The metal to be used in the thin metal layer on the surface of the heat insulating layer is selected from among the metals that are commonly used in metal plating and metal spray, as exemplified by chromium, nickel, copper, zinc, etc., as well as alloys based on these metals.

The metal layer of the invention can be coated by various methods and may be coated satisfactorily by plating. The plating as set forth herein may be chemical plating or electroplating. Plating is generally accomplished through some of the following steps. To be more specific, chemical plating is first applied in contact with the heat insulating layer.

Preliminary treatments (deburring and resin)→chemical etching (chemical etching with acids or alkalis: for providing a suitable degree of asperities on the surface) →neutralizing→sensitizing treatment (a metal salt having a reducing power is absorbed on the synthetic resin surface to render the activation effective)→activation treatment (a noble metal having a catalytic action is imparted to the resin surface)→chemical nickel plating→electroplating of nickel, chromium, etc. (for details, see, for example, "Plating on Plastics" by Shigetatsu Ro, 1974, The Nikkan Kogyo Shimbunsha, Ltd.).

In chemical plating, metal ions are treated with a reducing agent such that they are reduced to the metal and deposited. Chemical plating is generally required to satisfy the following representative conditions: (1) the reducing agent should remain stable without undergoing self-decomposition in an as-prepared plating bath: (2) the product of the reduction reaction should not precipitate; and (3) the deposition rate should be controllable by pH and bath temperature. In chemical nickel plating, hypophosphorous acid, boron hydride, etc. are used as the reducing agent, with hypophosphorous acid being used with particular satisfaction. In order to satisfy the above-described conditions, not only the primary ingredients (metal salt and reducing agent) but also auxiliary ingredients (pH modifier, buffer agent, accelerator, stabilizer, etc.) are incorporated in the chemical plating bath.

A chemical plated nickel layer that adheres intimately to the heat insulating layer of the invention preferably contains at least 1 wt % but less than 5 wt % of phosphorus, with the more preferred phosphorus content being at least 2 wt % but less than 5 wt %.

In the chemical nickel plating which can be used with satisfaction in the present invention, hypophosphorous acid is used as the reducing agent together with various auxiliary ingredients and phosphorus is eventually contained in the formed nickel plate. The mold of the invention which is coated with the heat insulating layer requires that the chemical plated nickel layer adhere firmly to the heat insulating layer and to this end it is highly preferred that the initial stage of chemical nickel plating in direct contact with the heat insulating layer is performed in such a way that the temperature of the plating bath is lowered and the pH adjusted to reduce the plating rate so that the nickel particles formed are sufficiently small to ensure uniform entrance of the nickel deep into the fine asperities on the surface of the heat insulating layer. After a specified thickness of the plate layer has been formed, the plating rate is increased to achieve efficient plating. As a result of the plating at low temperature and rate, the nickel plate layer in contact with the heat insulating layer contains at least 1 wt % and less than 5 wt %, preferably at least 2 wt % and less than 5 wt %, of phosphorus, and the overlying plate layer consist of one or more layers selected from an electroplated nickel layer, an electroplated chromium layer, a chemical plated nickel layer containing 5 to 18 wt % of phosphorus, and so forth. If chemical plated nickel of high phosphorus content, in particular chemical plated nickel containing at least 8 wt % of phosphorus, is directly applied to the surface of the heat insulating layer, large nickel particles forms and the adhesion of the plate layer tends to be low.

According to the present invention, the surface of the injection molded article is a dull surface with no more than 30% gloss and the invention also encompasses the case where part of the surface of the molded article is a dull surfaces of this definition. If the surface of the molded article is embossed like leathers or wood grain, it is also within the scope of the invention that either the high or low spots of the embossed surface have a dull surface while the other have a glossy surface. In this way, the embossed surface becomes very distinctive and hence is highly preferred. With this embossed surface, it is preferred that whichever the high or low spots that have the larger area preferably present a dull surface and the more preferred case is where the high spots have the larger area and provide a dull surface.

A preferred method of shaping an injection molded article having an embossed surface according to the invention is by using a mold that has a metal layer coated on the surface of the heat insulating layer, with said metal layer being embossed by acid etching. The metal layer is preferably such that a metal layer that is easy to acid etch is suitably combined with a metal layer that is difficult to acid etch. Examples of the metal layer that is difficult to acid etch include chemical plated nickel containing at least 8 wt % phosphorus and electroplated nickel or chromium having a sulfur content of no more than 0.0005 wt %. Examples of the metal layer that is easy to acid etch include chemical plated nickel containing less than 5 wt % phosphorus and electroplated nickel having a sulfur content of at least 0.005 wt %. These easily acid etchable metal layers can be easily embossed by etching. The outermost surface of the metal layer embossed by etching can satisfactorily be provided with improved corrosion resistance on the metal layer by coating with a corrosion-resistant metal layer, such as electroplated chromium or chemical plated nickel having a phosphorus content of at least 8 wt %. Shown below are specific examples of the preferred combinations of metal layers on an embossing mold.

(1) chemical plated nickel (containing 1 to 5 wt % phosphorus)→electroplated nickel (containing no more than 0.0005 wt % sulfur)→electroplated nickel (containing 0.005 to 0.5% sulfur)→(embossing by acid etch)→chemical plated nickel (containing 8 to 18 wt % phosphorus) or electroplated chromium.

(2) chemical plated nickel (containing 1 to 5 wt % phosphorus)→electroplated nickel (containing 0.005 to 0.5 wt % sulfur)→electroplated copper→(embossing by acid etch)→chemical plated nickel (containing 8 to 18 wt % phosphorus) or electroplated chromium.

(3) chemical plated nickel (containing 1 to 5 wt % phosphorus)→chemical plated nickel (containing 5 to 18 wt % phosphorus)→electroplated nickel (containing 0.005 to 0.5 wt % sulfur)→(embossing by acid etch)→chemical plated nickel (containing 8 to 18 wt % phosphorus) or electroplated chromium.

Particularly preferred for the present invention are (1) and (2) set forth above.

The acid etchability of chemical plated nickel varies with the phosphorus content of the nickel plate and as shown in Konrad Parker, Plating and Surface Finishing, March, 29 to 33 (1992), Ronald Dunkan, Proceedings EN' 93,27 (1993), etc., the acid resistance of chemical plated nickel increases abruptly when the phosphorus content exceeds 9 wt %. Corrosion-resistant nickel generally refers to chemical nickel containing 8 to 9 wt % phosphorus or more.

BRIEF DESCRIPTION OF DRAWINGS

FIG. 12 is a graph showing the time-dependent changes in the resin pressure that is applied to the inner surface of a die during injection molding.

FIGS. 13A, 13B, 13C and 13D illustrate by model how an injection molded synthetic resin fills fine asperities on a die surface.

FIGS. 16A, 16B and 16C show graphs representing the surface asperity patterns of the mold and the shaped article in Example 1.

FIGS. 17A, 17B and 17C show graphs representing the surface asperity patterns of the mold and the shaped article in Comparative Example 2.

BEST MODE FOR CARRYING OUT THE INVENTION

The present invention will now be described with reference to the drawings.

Figure 1:
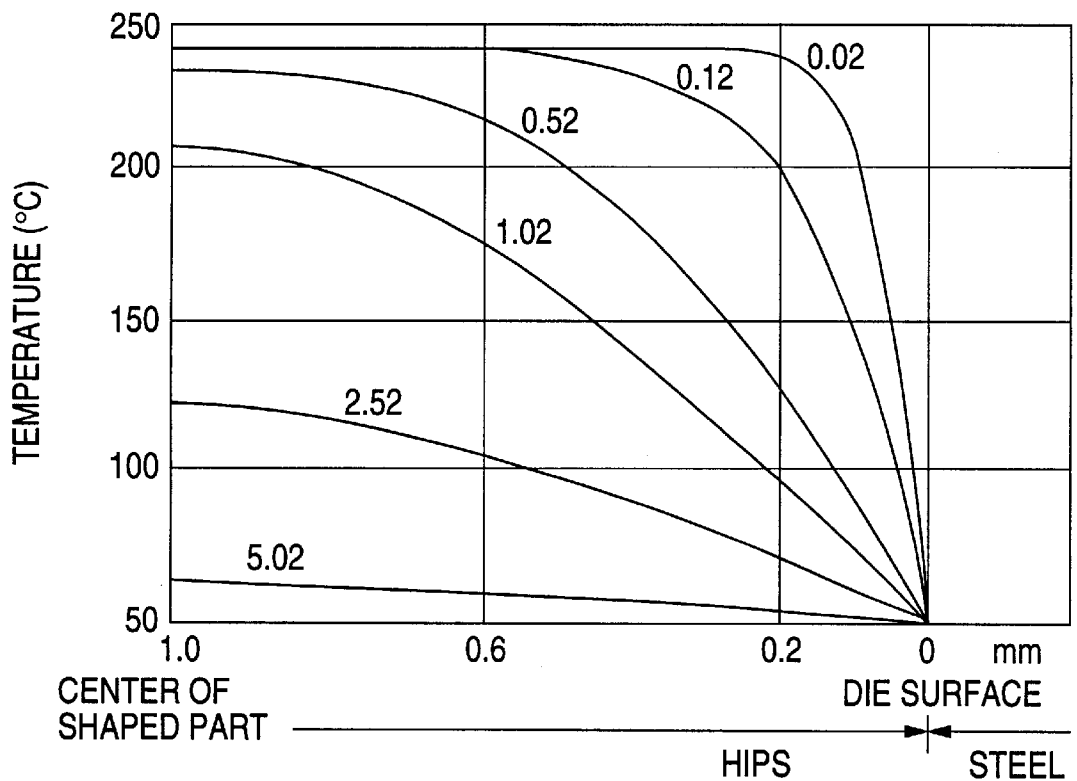
FIG. 1 is a graph showing the changes (calculated) in the temperature profile near the inner surface of a main steel mold that occurred when the mold was contacted by a heated synthetic resin.
Figure 2:
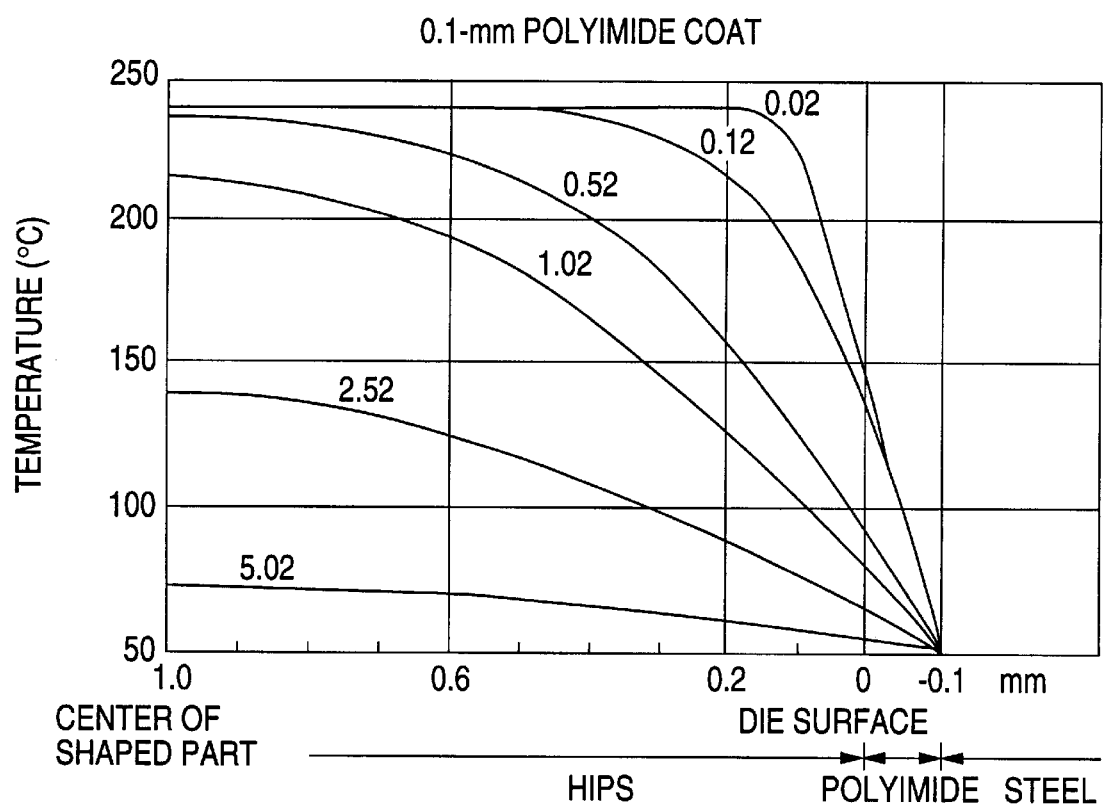
FIG. 2 is a graph showing the changes (calculated) in the temperature profile near the inner surface of a main steel mold having a 0.1-mm polyimide coat on the die surface that occurred when the mold was contacted by a heated synthetic resin.
Figure 3:
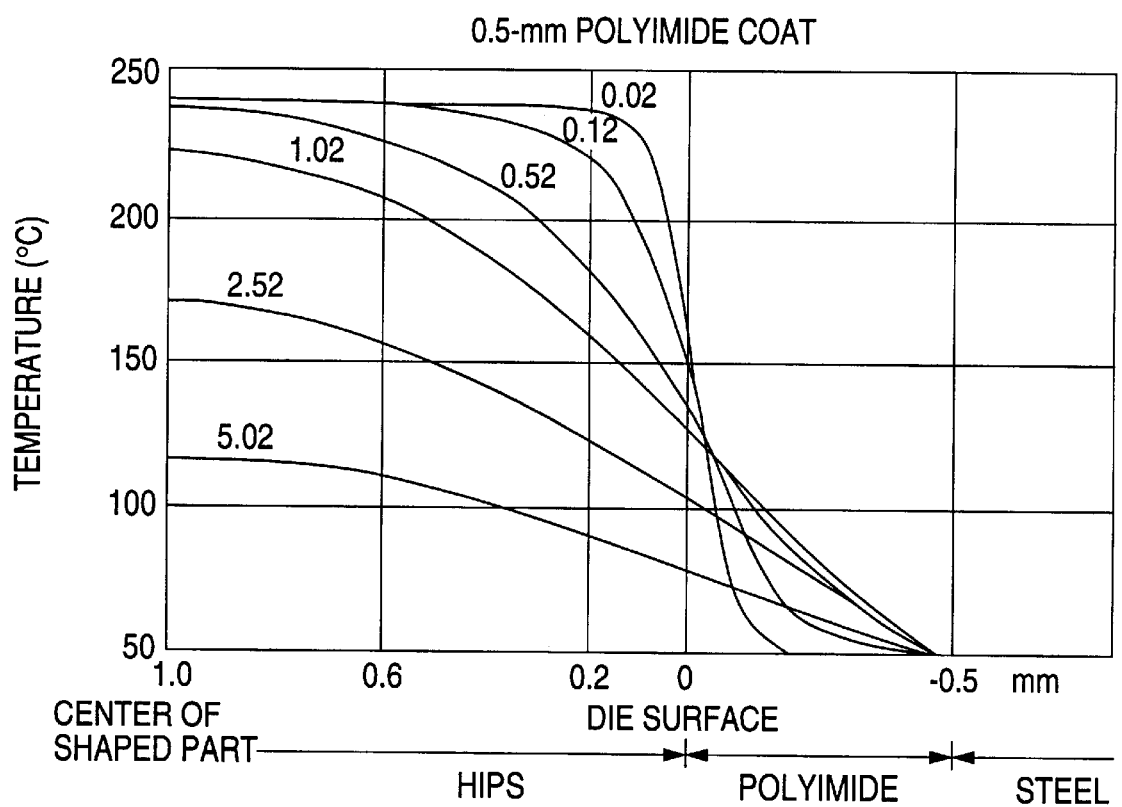
FIG. 3 is a graph showing the changes (calculated) in the temperature profile near the inner surface of a main steel mold having a 0.5-mm polyimide coat on the die surface that occurred when the mold was contacted by a heated synthetic resin.

FIGS. 1, 2 and 3 shows the calculated values of the changes in the temperature profile near the inner surface of a main mold that occurred when injection molding was performed at a mold temperature of 50° C. with the temperature of a rubber reinforced polystyrene at 240° C. The numerals on the respective curves in each figure represent the time (in seconds) passed after the heated synthetic resin contacted the cooled inner mold surface. Upon contacting the inner die surface, the heated synthetic resin is cooled rapidly whereas the temperature of the die surface is increased by the heat of the hot synthetic resin. As shown in FIGS. 2 and 3, when the mold surface is coated with the heat insulating layer (polyimide), the surface of the heat insulating layer in contact with the synthetic resin experiences an increased temperature rise, as well as a decrease in the rate of temperature drop.

With the coat of the heat insulating layer, the shorter the time that passes after the synthetic resin contacts the inner mold surface, the higher the temperature of the die surface; hence, the coating with the heat insulating layer provides the same effect as would be obtained by significantly increasing the mold temperature.

FIGS. 4, 5, 6, 7, 8 and 9 show the results of injection molding which was performed using a main steel mold having a polyimide layer on the surface which, in turn, was coated with a nickel layer and a comparative mold coated with only a polyimide layer, with the mode temperature being set at 50° C. and with a rubber reinforced polystyrene resin injection molded at a temperature of 240° C.; the figures specifically show the resulting time-dependent changes in the temperature of the resin surface (which is either the temperature at the interface between the resin surface and the nickel surface or the temperature at the interface between the resin surface and the polyimide surface).

Figure 4:
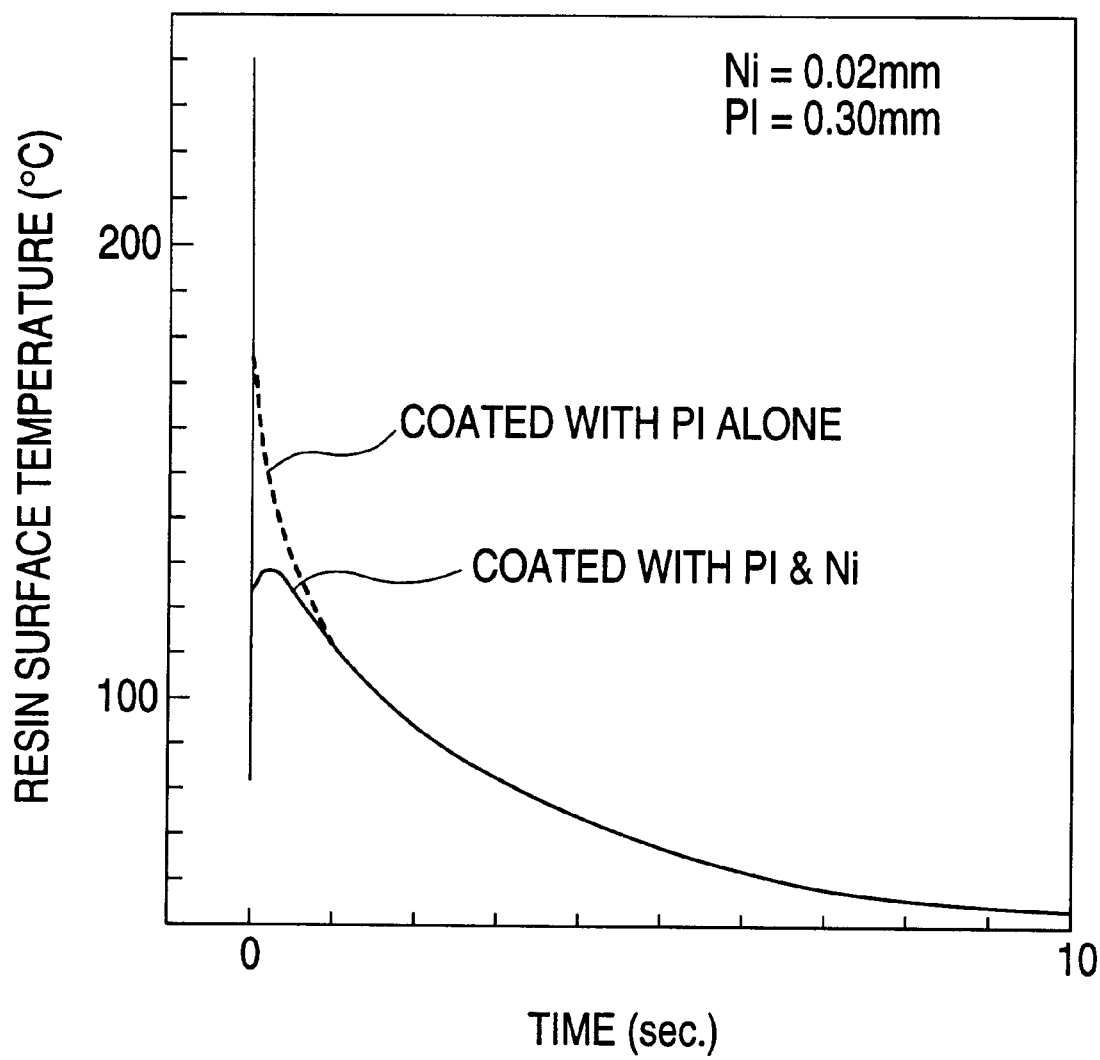
FIG. 4 is a graph showing the change (calculated) in the temperature of the synthetic resin surface (at the interface between the synthetic resin surface and the mold surface) that occurred when a main steel mold having a 0.3-mm polyimide coat which in turn was overlaid with a 0.02-mm nickel coat was contacted by a heated synthetic resin.

FIG. 4 shows the time-dependent change in the resin surface temperature in the case where the thickness of the polyimide (hereinafter designated by PI in figures) layer was adjusted to 0.30 mm and the thickness of the nickel (hereinafter designated by Ni in figures) layer to 0.02 mm. The solid line in the figure represents the case where both polyimide and nickel layers were coated and the dashed line represents the case where only the polyimide layer was coated. When only polyimide coating was applied, the temperature of the resin surface decreased with the lapse of time whereas in the case of coating with both polyimide and nickel layers, the temperature decreased sharply, then increased and thereafter decreased gradually. This is because the nickel in the surface layer had such a great heat capacity that the heat of the resin was absorbed by the nickel layer to cause a temperature drop. Therefore, the greater the thickness of the nickel layer, the greater the initial temperature drop and the lower the temperature of the subsequent rebound.

Figure 5:
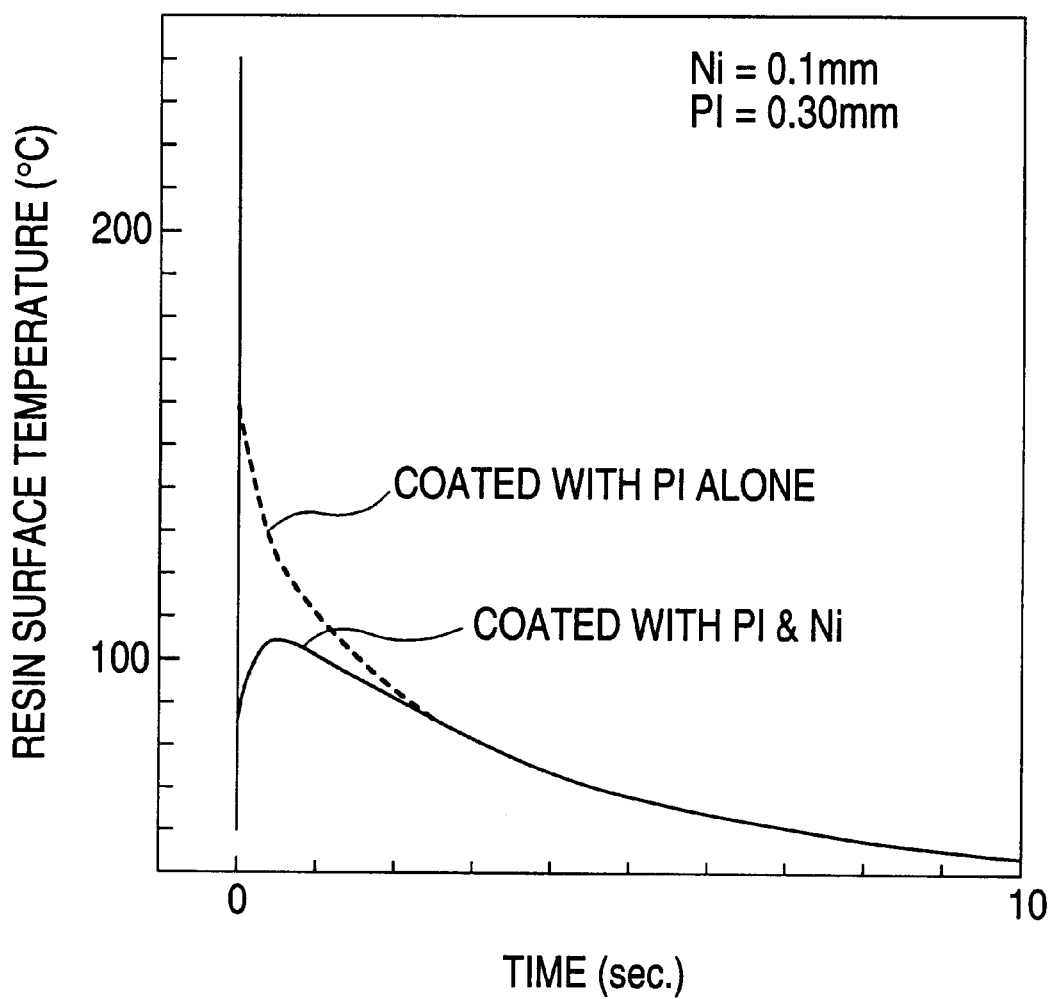
FIG. 5 is a graph showing the change (calculated) in the temperature of the synthetic resin surface (at the interface between the synthetic resin surface and the mold surface) that occurred when a main steel mold having a 0.3-mm polyimide coat which in turn was overlaid with a 0.1-mm nickel coat was contacted by a heated synthetic resin.

FIG. 5 shows the case where the thickness of the nickel layer was increased to 0.1 mm; when the nickel layer was thick, the initial temperature drop was great and the temperature of the subsequent rebound was low.

Figure 6:
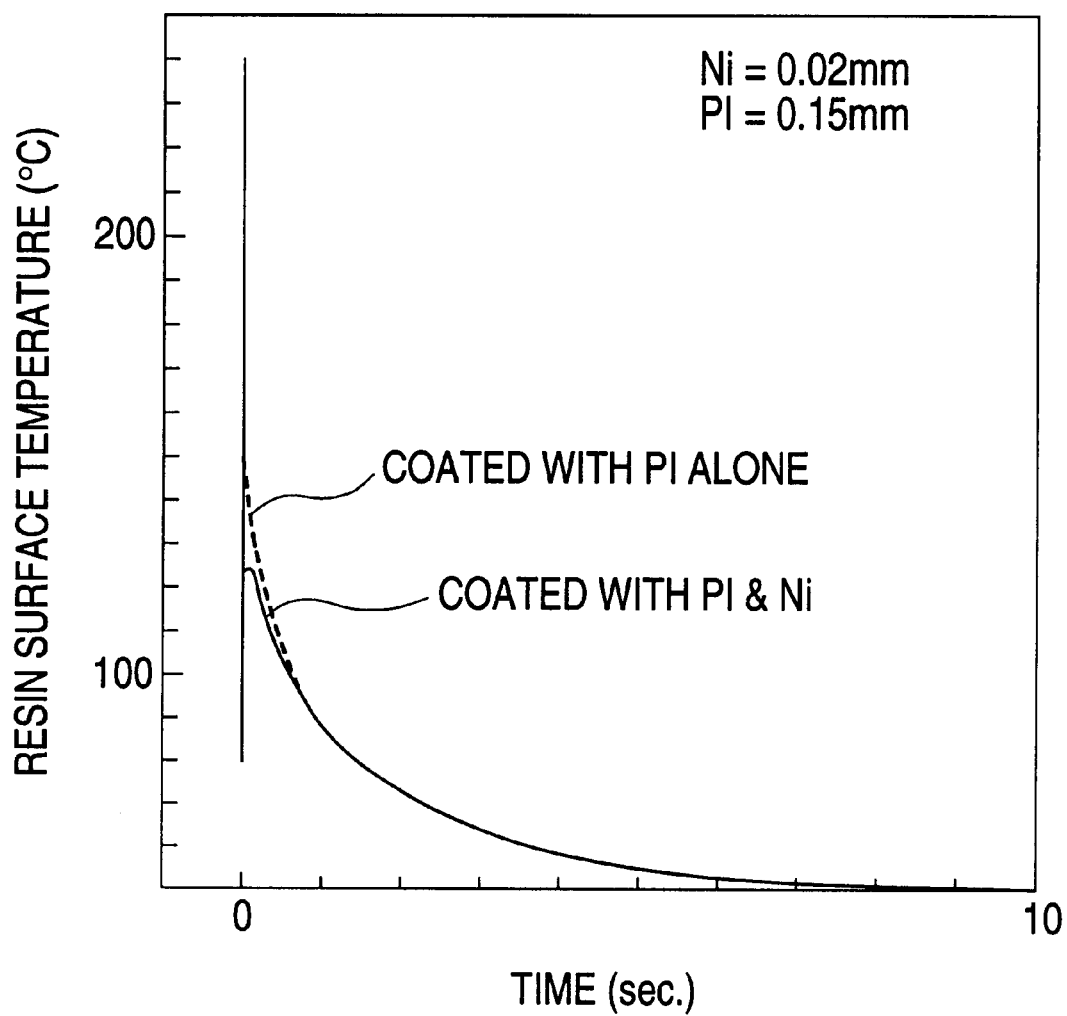
FIG. 6 is a graph showing the change (calculated) in the temperature of the synthetic resin surface (at the interface between the synthetic resin surface and the mold surface) that occurred when a main steel mold having a 0.15-mm polyimide coat which in turn was overlaid with a 0.02-mm nickel coat was contacted by a heated synthetic resin.
Figure 7:
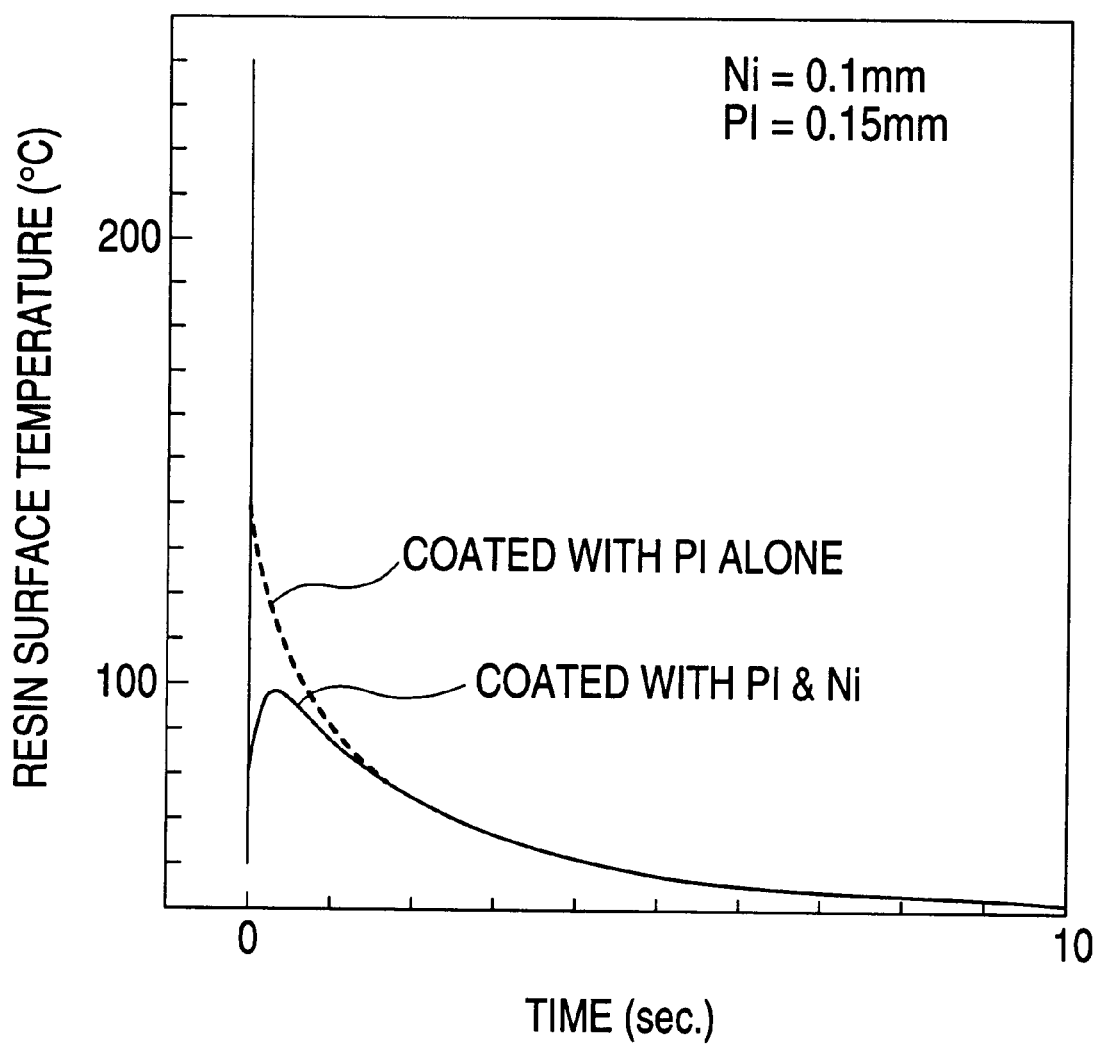
FIG. 7 is a graph showing the change (calculated) in the temperature of the synthetic resin surface ( at the interface between the synthetic resin surface and the mold surface) that occurred when a main steel mold having a 0.15-mm polyimide coat which in turn was overlaid with a 0.1-mm nickel coat was contacted by a heated synthetic resin.

FIGS. 6 and 7 show the results with the same layer arrangement as in FIGS. 4 and 5, except that the thickness of the polyimide layer was changed to 0.15 mm. Even when the thickness of the polyimide layer was 0.15 mm, the same tendency was observed as in FIGS. 4 and 5.

Figure 8:
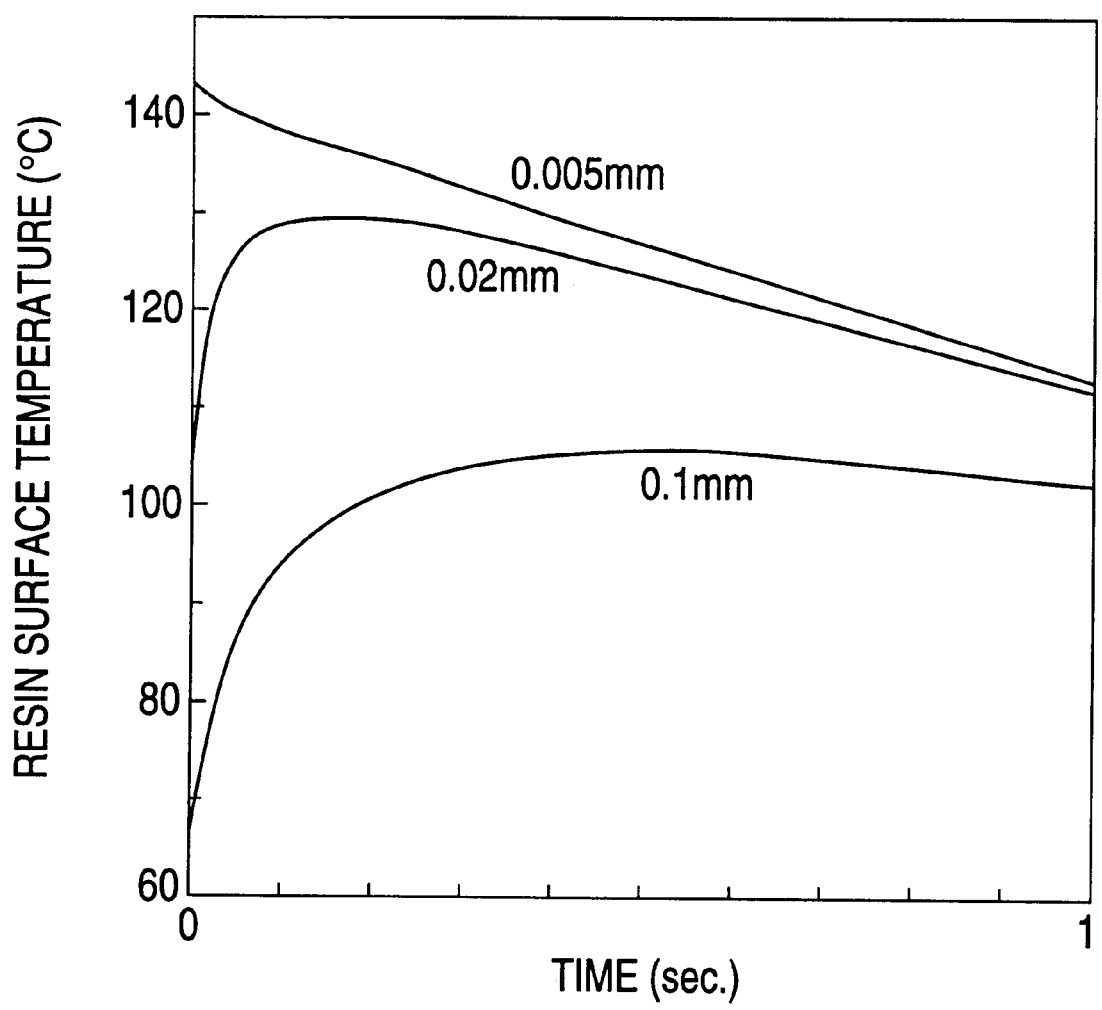
FIG. 8 is a graph showing the changes (calculated) in the temperature of the synthetic resin surface (at the interface between the synthetic resin surface and the mold surface) that occurred when a main steel mold having a 0.3-mm polyimide coat which in turn was overlaid with a nickel coat at a thickness of 0.0005 mm, 0.02 mm or 0.1 mm was contacted by a heated synthetic resin.
Figure 9:
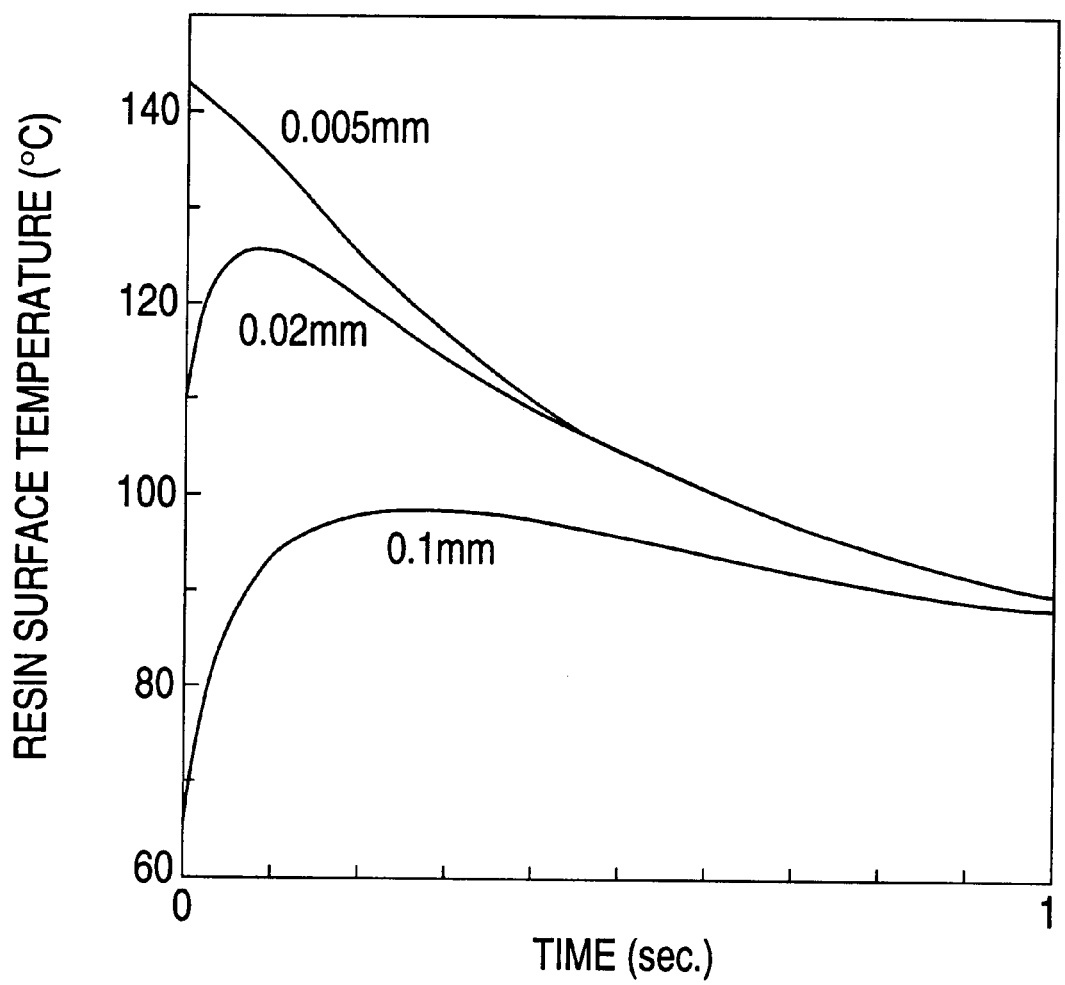
FIG. 9 is a graph showing the changes (calculated) in the temperature of the synthetic resin surface (at the interface between the synthetic resin surface and the mold surface) that occurred when a main steel mold having a 0.15-mm polyimide coat which in turn was overlaid with a nickel coat at a thickness of 0.0005 mm, 0.02 mm or 0.1 mm was contacted by a heated synthetic resin.

FIGS. 8 and 9 show collectively the results shown in FIGS. 4 to 7. From FIGS. 8 and 9, one can see that in the case of the mold having the coat of nickel layer on the heat insulating layer, the temperature that could be reached by rebound following the initial drop in the surface temperature was so low when the thickness of the nickel layer was 0.1 mm that the reproduction of the die surface during injection molding would deteriorate. When the thickness of the nickel layer was 0.02 mm, the initial drop in the resin surface temperature was followed by a rapid rebound to a sufficiently high temperature to ensure satisfactory reproduction of the die surface during injection molding. These data show that the thickness of the metal layer coated on the surface of the heat insulating layer should no exceed a certain limit in order to ensure good reproduction of the die surface and the thickness of the metal layer is no more than 1/5, preferably no more than 1/7, more preferably between 1/7 and 1/100, of the thickness of the heat insulating layer, and the absolute value of the thickness of the metal layer is selected preferably from the range of 1 to 50 μm, more preferably from the range of 3 to 30 μm.

Figure 10:
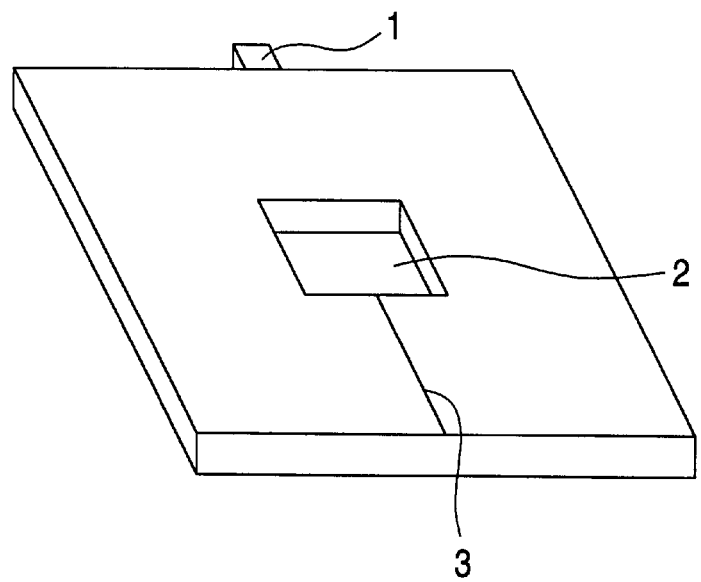
FIG. 10 is a perspective view showing an example of injection molded article.
Figure 11:
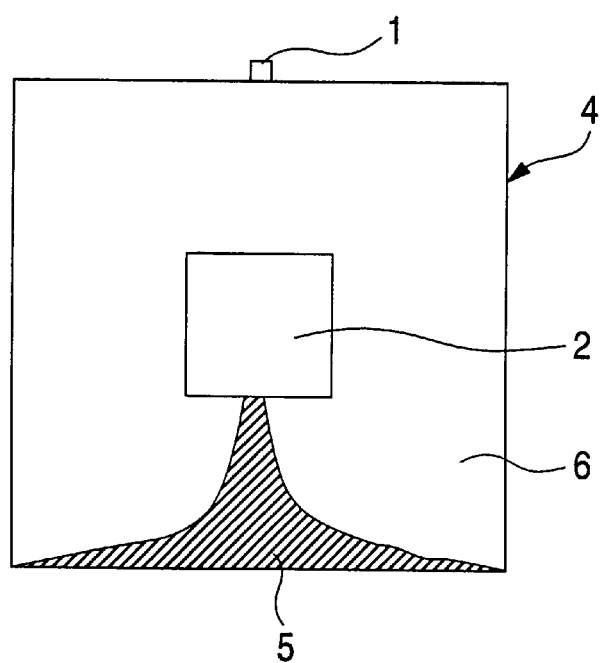
FIG. 11 is a sketch for illustrating the injection molded article shown in FIG. 10.

A more detailed explanation will now be made with reference to the exemplary injection molded article shown in FIGS. 10 and 11. Referring to FIG. 10, a synthetic resin injected through a gate 1 flows in two streams around a hole 2, which then merge in the weld portion to form a weld line 3. Referring to FIG. 11, if injection molding is performed with a mold coated with the heat insulating layer having fine asperities on the surface, the fine asperities on the surface of the heat insulating layer are transferred onto the surface of the molded article. However, if injection molding is performed with a mold having the coat of the heat insulating layer that has been provided with fine asperities by sand blasting which is commonly used to produce dull surfaces, the region of the shaped article 4 extending from the weld portion to the resin flow end portion (which region is hereinafter abbreviated as weld portion 5 in all instances where explanation is made with reference to drawings) has an increased degree of fine asperities and it was found that when molding was done using a black pigmented resin, the weld portion 5 became blackish whereas the general portion 6 became whitish, thus failing to produce a shaped article having the uniform gloss as set forth herein. While the cause of this phenomenon is not completely clear, the following assumption may be valid. The cause will now be described with reference to FIGS. 12 and 13.

The pressure that is applied to the inner surface of the die in the weld portion 5 and the general portion 6 during injection molding of the shaped article shown in FIG. 11 is illustrated by model in FIG. 12. In FIG. 12, the pressure applied to the general portion 6 of the shaped article is represented by curve 7 and the pressure applied to the weld portion 5 is represented by curve 8. Curve 9 represents the pressure applied to the gate portion. Obviously, the pressure applied to the general portion 6 increases gradually with the lapse of injection time whereas high pressure is applied to the weld portion 5 as soon as the synthetic resin contacts the inner surface of the die.

As FIG. 2 shows, when the heated synthetic resin contacts the inner surface of the mold coated with the heat insulating layer, the surface of the heat insulating layer is heated and immediately thereafter, cooling starts. In FIG. 2, the temperature of the die surface drops below 100° C. in 0.52 seconds and so does the temperate of the synthetic resin in contact with the die surface. In order to ensure better reproduction of the die surface, it is necessary that high pressure be applied to the resin as soon as the heated synthetic resin contacts the inner surface of the mold, namely, high pressure must be applied to the resin while the inner mold surface and the surface layer portion of the synthetic resin remain hot. As FIG. 12 shows, the weld portion is such that high pressure is applied to the synthetic resin as soon as it contacts the inner mold surface, whereby the fine asperities on the inner mold surface are reproduced more exactly.

The process under consideration will now be described by model in FIGS. 13A, 13B 13C, and 13D. The inner surface of the mold comprises the heat insulating layer 10 which has fine asperities as shown at FIG. 13A. If injection molding is performed with this mold, the pressure of synthetic resin 11 increases gradually in the general portion of the shaped article after it contacts the inner mold surface, so the inner mold surface and the surface layer portion of the resin cools down as the resin pressure is increasing and the resin cannot get deep into the fine asperities in the inner mold surface (FIG. 13B). However, in the weld portion of the shaped article, the resin pressure increases as soon as the synthetic resin 11 contacts the inner mold surface, so the synthetic resin can get sufficiently deep into the fine asperities of the mold (FIG. 13C). As a result, the shaped article has coarse asperities in the surface of the weld portion 5 as compared to the general portion 6 and, if the synthetic resin is a black pigmented one, the weld portion appear blackish and the desired uniform dull state cannot be attained.

This phenomenon is a problem peculiar to the case of performing injection molding using the mold coated with the heat insulating layer and the present invention provides a shaped article eliminating this defective phenomenon. The present invention relates to a shaped article characterized in that the dull surface in the weld and general portions has uniform gloss. In order to ensure that the weld and general portions of the shaped article have uniform surface asperities, a suitable degree of asperities has to be selected for the fine asperities in the surface of the heat insulating layer. While the present invention has been described above with reference to the shaped article having a simple shape as shown in FIGS. 10 and 11, housings of electrical appliances and the like have complex shapes that are formed with a multiple-point gate and in such complex shaped moldings, it often occurs that not only the general and weld portions but also the areas on both sides of the weld line develops a deference in dullness. The areas on both sides of the weld line develops such a difference if there is a difference in the resin flow rate between the two areas. As for the resin on the fast flowing side, the resin pressure is applied fast after it contacts the inner mold surface whereas the resin on the slow side applies pressure slowly after it contacts the inner mold surface, thus increasing the chance of the development of a difference in the reproduction of the die surface between the two areas. The present invention is particularly effective in a case like this.

Figure 14:
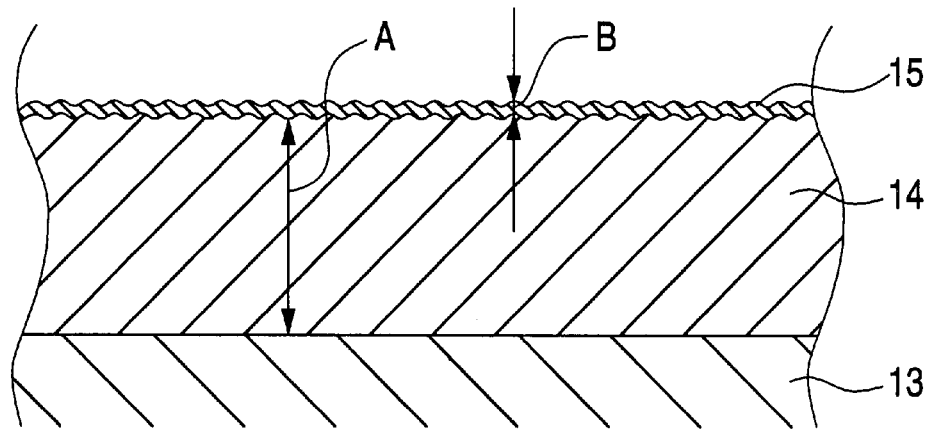
FIG. 14 is a cross section of a mold for shaping the molded article of the invention.
Figure 15:
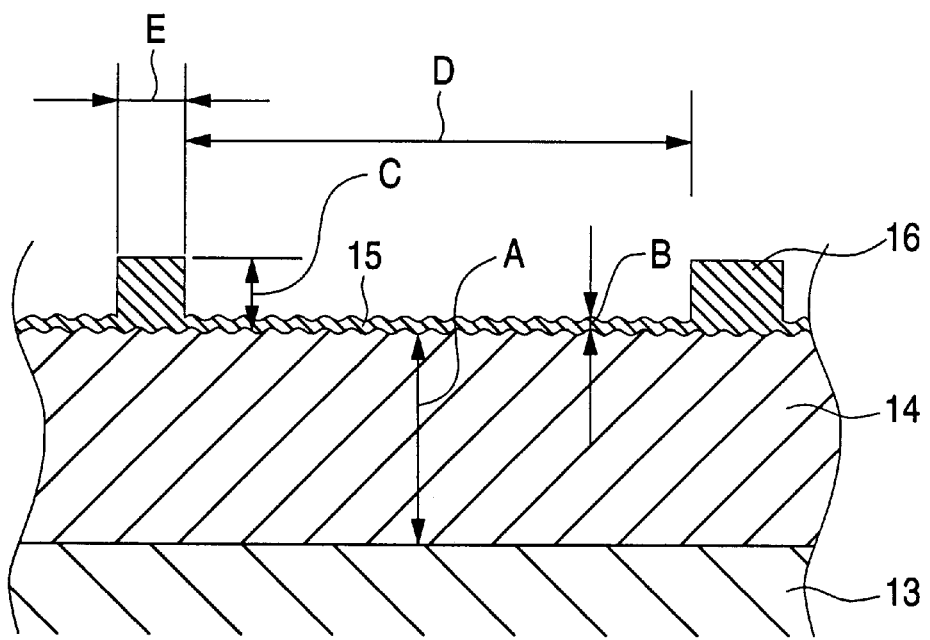
FIG. 15 is a cross section of another mold for shaping the molded article of the invention.

FIGS. 14 and 15 show cross sections of molds for shaping the molded article of the invention and both refer to the case where a thin metal layer exists on the surface of the heat insulating layer.

Referring to FIG. 14, a metallic main mold 13 is overlaid with a heat insulating layer 14 having fine asperities on the surface and the layer 14 in turn is overlaid with a thin metal layer 15; the thickness B of said metal layer 15 is much smaller than the thickness A of the heat insulating layer 14, with B being no more than 1/5, preferably no more than 1/7, more preferably between 1/7 and 1/100, of A, and the absolute value of the thickness of the metal layer is selected preferably from the range of 1 to 50 μm, more preferably from the range of 3 to 30 μm. If the metal layer is thin enough, the temperature of the die surface drops temporarily right after it is contacted by the heated resin but is immediately rises to enable the reproduction of the die surface, as already described by reference to FIGS. 4 to 9. The surface of the thin metal layer 15 preferably reproduces the fine asperities in the surface of the heat insulating layer and this can be accomplished by applying a thin metal layer on the surface of the heat insulating layer through chemical plating. It should, however, be noted that the present invention also encompasses the case where the surface of the heat insulating layer is smooth and overlaid with a thin metal layer having a suitable degree of fine asperities.

FIG. 15 shows the case where the metal layer shown in FIG. 14 is embossed like a leather or wood grain. Stated more specifically, the metal layer consists of a thin metal layer 15 having fine asperities on the surface that defines low spots of the mold and a somewhat thicker metal layer 16 that defines high spots of the mold and the sum of the areas of the low spots is preferably greater than the sum of the areas of the high spots. The thickness B of the metal layer in each low spot must not be more than 1/5, preferably not more than 1/7, of the thickness A of the heat insulating layer. The thickness of the metal layer in each high spot is selected such that the average thickness of the metal layer in the high and low spots is no more than 1/5, preferably no more than 1/7, of the thickness of the heat insulating layer. However, the thickness C of the metal layer in each high spot is preferably no more than about 1/3 of the thickness A of the heat insulating layer.

The mold coated with the heat insulating layer which forms the molded article of the invention can be produced by various methods. Carefully selected sandblasting and post-treatment of the heat insulating layer or the application of a paint of the heat insulating layer incorporating a fine powder can be used in the present invention with the greatest satisfaction.

Sandblasting is a common method of creating dull surfaces. The surface of the heat insulating layer having fine asperities can be formed by sandblasting and the like. The size of the asperities to be formed can be adjusted by the size of the sand grit to be blown, the properties of the sand grit, the blowing air pressure (blow rate) and the blow time. However, if fine asperities are formed by merely applying the most common sandblasting system, it is difficult to provide the desired uniform dull surface in the weld and general portions. The molded article of the present invention can be obtained by using a die surface having an appropriately selected profile asperities. For example, as shown in FIG. 13D, a solution of a heat-resistant polymer is cast in a suitable mount into the low spots of the fine asperities formed by sandblasting and subsequently heated to have the heat insulating material 12 deposited in a suitable amount on the bottom of each of the low spots such as to adjust the depth of the low spots and by the performance of shaping using the resulting mold coated with the heat insulating layer, a uniform dull surface can be provided in the general and weld portions. This is what is meant by the statement in the present invention that a heat-resistant polymer is cast into the low spots of the surface having asperities such as to adjust the depth of the low spots. Other methods that can be employed to produce the mold coated with the heat insulating layer having asperities suitable for the invention include the performance of sandblasting using ceramics and the like having a strictly limited particle size and shape, as well as the combination thereof with another sandblasting system.

However, a heat insulating layer having fine asperities in the surface that can be used in the invention with the greatest satisfaction is formed by coating the outermost surface of the heat insulating layer with a heat insulating material made of a heat-resistant polymer incorporating 5 to 50 wt % of a fine powder. Fine powders that can be used are inorganic fine powders such as silicon oxide, calcium carbonate, talc, clay and kaolin that have particle sizes of 0.001 to 300 μm. What can be used with particular satisfaction are fine silicon oxide powders having extremely small particle sizes of 0.001 to 0.1 μm (e.g. fine powders marketed under trade names such as "AEROSIL") or inorganic powders such as fine silicon oxide particles having an average particle size of about 0.1 to 50 μm (e.g. "TOSPEARL" of Toshiba Silicone Co., Ltd. and "TORAYFEL" of Toray Industries, Inc.) and talc. These fine powders may be incorporated in a paint of heat insulating material, for example, a paint such as a polyimide precursor solution, in solids content of preferably 5 to 50%, more preferably 10 to 40 wt %, thereby preparing a satisfactory paint. By applying this paint onto the surface of the heat insulating layer, one can produce a satisfactory mold that is coated with the heat insulating layer having fine asperities on the surface and which is suitable for use in the present invention.

The most satisfactorily usable inorganic fine powder "AEROSIL" (product of Nippon Aerosil Co., Ltd.) is formed of highly pure silicon oxide ($SiO_2$) and available as fine particles having a specific surface area of about 50 to 400 m$^2$/g. Each particle is spherical and has a silanol group present on the surface. This silanol group interreacts with the silanol groups on other particles by hydrogen bonding to form a three-dimensional network structure. Upon agitation or vibration, this network structure breaks and a viscosity drop occurs. At rest, the particles produce a network structure again and the viscosity increases. If "AEROSIL" is incorporated in an amount of 5 to 50 wt % in a paint of heat insulating material such as a polyimide precursor solution and applied by spraying onto the surface of the main mold or the heat insulating layer, the as sprayed paint has a low enough viscosity to permit coating and when it is deposited on the mold surface, it becomes highly viscous and forms a surface having a suitable degree of fine asperities. The AEROSIL containing heat insulating layer may form the entire part of the heat insulating layer but it suffices to be present on the outermost surface of the heat insulating layer and, generally, the outermost surface of the heat insulating layer which is about 3 to 30 μm thick is comprised of this AEROSIL containing heat insulating layer. It has been found that the resulting surface with fine asperities is most preferred for the mold that is coated with the heat insulating layer having fine asperities on the surface and which is used to shape the molded article of the invention. The fine particles of silicon oxide which are marketed under trade names such as "TOSPARL" and "TOREFIL" are available in various types such as those having uniform particle sizes or those having broad particle size distributions and by incorporating suitable combinations of these particles in a heat insulating material, one can prepare heat insulating layers having various types of surface asperities.

In addition, if the outermost surface of the heat insulating layer is formed of a heat insulating material incorporating fine particles or powders such as silicon oxide like AEROSIL, the advantage of imparting scratch resistance to the heat insulating layer occurs pronouncedly.

In the present invention, the thus produced mold having the coat of the heat insulating layer is used to perform molding and thereby produce the injection molded article of the invention which has a uniform dull surface and in which the weld line is not noticeable.

EXAMPLES

The following molds, materials and so forth are used.
Main mold: This is made of a steel material (S55C) and has a die cavity corresponding to the molded article shown in FIG. 10. The molded article has a size of 100 mm×100 mm in a thickness of 2 mm, with a hole of 30 mm×30 mm made in the center. The gate is a side gate as shown in FIG. 10. The mold surfaces are specular. Eight inserts to form the die cavity of this main mold are provided and the surfaces of each insert are subjected to various surface treatments. Seven out of the eight inserts are plated with hard chromium.

Main mold having fine asperities on the surface: The surface of the main mold having no chromium plate is sandblasted to be rendered dull. For providing the dull surface, No. NH1008 of Nippon Etching Co., Ltd. (blowing air pressure of 3.7 kg/cm$^2$) is used.

Polyimide precursor and cured polyimide: Linear high-molecular weight polyimide precursor solution "TORENEES #3000" (product of Toray Industries, Inc.). The performance of the cured polyimide is: Tg, 300° C.; heat conductivity, 0.0005 cal/cm•sec•° C.; elongation at break, 40%.

Polyimide coated mold: A chromium plated main mold is coated with a thin layer of a primer capable of good adhesion to said main mold (a precursor polyimide solution having many carbonyl groups) and then a process consisting of the application of the polyimide precursor solution and partial imidation by heating at 160° C. is repeated ten times and, finally, heating is done until 290° C. is reached, whereby 100% imidation is accomplished to provide a polyimide coat on the die surface, which is polished to a specular state, thereby providing a mold having the polyimide coat in a thickness of 150 μM.

Molds (A), (B), (C), (D) and (E) with a polyimide coat having fine asperities on the surface:

(A): The surface of the polyimide coated mold is sandblasted to be rendered dull. For matting, No. NH1008 of Nippon Etching Co., Ltd. (blowing air pressure of 1.8 kg/cm$^2$) is practiced.

(B): The surface of mold (A) with a polyimide coat having fine asperities on the surface is coated with a polyimide solution (applied in a 5-μm thickness as polyimide solids), then cured by heating at 290° C. to adjust the depth of low spots of the polyimide surface. The surface roughness of the die surface is: Ra, 1.0 μm; Rmax, 16 μm; Rz, 10 μm; S, 0.065 mm.

(C): To a polyimide precursor solution, "AEROSIL #100" (product of Nippon Aerosil Co., Ltd.) is added in an amount of 30 wt % of the solids content and the ingredients are put into a tumbler; for assuring a thorough agitating effect, glass beads are also put in and mixing is performed to prepare an AEROSIL containing polyimide precursor solution. The surface of the polyimide coated mold is spray coated with said AEROSIL containing polyimide precursor solution and then heated at 290° C. to form an AEROSIL containing polyimide layer on the outermost surface in an average thickness of 15 μm, thereby preparing a surface with fine asperities that is formed of AEROSIL aggregates. The surface roughness of the die surface is: Ra, 1.2 μm; Rmax, 8.8 μm; Rz, 7.5 μm; S, 0.113 mm.

(D): A surface with fine asperities is prepared by repeating the procedure described under (C), except that the agitation with the tumbler is effected without glass beads and that filtration with a #100 stainless steel mesh is effected to prepare an AEROSIL containing polyimide precursor solution. The surface roughness of the die surface is: Ra, 3.6 μm; Rmax, 22 μm; Rz, 20 μm; S, 0.14 mm.

(E): Prior to the heating at 290° C. in the fabrication of mold (C), a light-sensitive polyimide "PIMEL" (the trade name of Asahi Chemical Industry Co., Ltd.) is applied to the mold surface to form a light-sensitive polyimide layer in a thickness of 20 μm as solids; subsequently, an embossed masking film is attached, uv exposure is performed, the uncrosslinked polyimide is removed by solvent washing, and imidation is performed by thermal cure at 290° C. to produce a polyimide coated mold having an embossed surface with fine asperities, in which the low spots of the die surface have fine asperities whereas the high spots are smooth. The sum of the areas of the low spots is greater than the sum of the areas of the high spots and is about twice as large. The surface roughness of the low spots of the die surface is substantially the same as the surface roughness of mold (C).

Molds (X), (Y) and (Z) coated with a thin metal layer having fine asperities on the surface:

(X): After the application of the AEROSIL containing polyimide in the fabrication of mold (C), a polyimide precursor solution incorporation a fine calcium carbonate powder is applied to prepare a polyimide coated mold having fine asperities on the surface, in which the outermost surface is formed of a calcium carbonate powder containing polyimide layer 3 to 10 $\mu$m thick. The die surface of this mold is etched with an acid solution to provide fine asperities and then chemically plated with nickel in a thickness of 3 $\mu$m to produce a mold coated with a thin metal layer having fine asperities as shown in FIG. 14. The chemically plated nickel consists of a 0.5-$\mu$m thick layer containing 3 to 4 wt % phosphorus in intimate contact with the heat insulating layer and an overlying 1.5-$\mu$m layer containing 5 to 7 wt % phosphorus. The chemically plated nickel reproduces the fine asperities in the surface of mold (C) in a satisfactory manner and the surface roughness of the die surface is substantially the same as the surface roughness of mold (C). Referring to FIG. 14, A is 165 $\mu$m and B is 3 $\mu$m.

(Y): After the application of the AEROSIL containing polyimide in the fabrication of mold (C), a polyimide precursor solution incorporation a fine calcium carbonate powder is applied to prepare a polyimide coated mold having fine asperities on the surface, in which the outermost surface is formed of calcium carbonate powder containing polyimide layer 3 to 10 $\mu$m thick. The die surface of this mold is etched with an acid solution to provide fine asperities and then chemically plated with nickel in a thickness of 0.5 $\mu$m containing 3 to 4 wt % phosphorus to produce a mold coated with a thin metal layer having fine asperities as shown in FIG. 14. The surface of this mold is electroplated with nickel in a thickness of 2 $\mu$m containing 0.0005 wt % sulfur, which in turn is overlaid with electroplated nickel in a thickness of 15 $\mu$m containing 0.005 wt % sulfur, thereby forming a nickel layer in a total thickness of 17.5 $\mu$m. The nickel surface is then coated with a light-sensitive resin, overlaid with an adhering embossed masking film, uv exposed, has the uncrosslinked light-sensitive resin removed by solvent washing and has the electroplated nickel layer etched with an acid solution so as to produce an embossed surface. The surface of the high spots of said embossed surface are polished to become glossy and overlaid with chemical plated nickel (containing 8 wt % phosphorus) in a thickness of 2 $\mu$m to impart corrosion resistance to the metal layer, thereby producing a mold coated with an embossed metal layer as shown in FIG. 15. Referring to FIG. 15, A is 165 $\mu$m, B is 4.5 $\mu$m and C is 15 $\mu$m. The high spots of the mold surface have a glossy surface whereas the low spots have a dull surface. The sum of the areas of the low spots is greater than the sum of the areas of the high spots and is bout twice as large. The surface roughness of the low spots on the die surface is substantially the same as the surface roughness of mold (C).

(Z): The procedure described for mold (Y) is repeated, except that chemical plated nickel containing 3 to 4 wt % phosphorus is deposited in a thickness of 0.5 $\mu$m to prepare a mold coated with a thin metal layer having fine asperities as shown in FIG. 14. The surface of this mold is electroplated with nickel (containing 0.005 wt % sulfur) in a thickness of 2 $\mu$m, which in turn is overlaid with electroplated copper in a thickness of 13 $\mu$m, forming a metal layer in a total thickness of 15.5 $\mu$m. The surface of the electroplated copper layer is then coated with a light-sensitive resin, overlaid with an adhering embossed masking film, uv exposed, has the uncrosslinked light-sensitive resin removed by solvent washing and has the electroplated nickel layer etched with an acid solution so as to produce an embossed surface. The surface of the high spots of said embossed surface are polished to become glossy and overlaid with electroplated chromium in a thickness of 2 $\mu$m to impart corrosion resistance to the metal layer, thereby producing a mold coated with an embossed metal layer as shown in FIG. 15. Referring to FIG. 15, A is 165 $\mu$m, B is 4.5 $\mu$m and C is 15 $\mu$m. The high spots of the mold surface have a glossy surface whereas the low spots have a dull surface. The sum of the areas of the low spots is greater than the sum of the areas of the high spots and is about twice a large. The surface roughness of the low spots of the mold surface is substantially the same as the surface roughness of mold (C).

Synthetic resin to be injection molded: Black pigmented ASAHI KASEI polystyrene 492 (product of Asahi Chemical Industry Co., Ltd.) has a Vicat softening temperature of 105° C.

Conditions of injection molding: Injection molded at a synthetic resin temperature of 230° C. and a main mold's temperature of 50° C.

Measurement of a pattern of surface asperities: Measured with a surface roughness profile analyzer "SURFCOMB 570A" of Tokyo Seimitsu Corp. Ltd.

Example 1

Injection molding is performed using polyimide coated mold (B) having fine asperities on the surface. The shaped part has a uniform degree of dullness in the general and weld portions, with 5% gloss, and no visible flaws develop at hardness B in a pencil scratch test. The weld line has a dent of no more than 1 $\mu$m and it is by no means noticeable; the shaped part is an injection molded article having a satisfactory uniform dull surface. FIGS. 16A, 16B and 16C show surface asperity patterns: the surface asperity pattern of the mold is shown at FIG. 16A; the surface asperity pattern of the general portion of the shaped article is shown at FIG. 16B; and the surface asperity pattern of the weld portion of the shaped part is shown at FIG. 16C. These patterns exhibit almost comparable degrees of surface asperities and their surface roughness is substantially the same as the surface roughness of mold (B).

Comparative Example 1

Injection molding is performed using the main mold having fine asperities on the surface. The shaped part obtained by using said mold which is not coated with a heat insulating layer has a noticeable unseemly weld line, which has a dent of 5 $\mu$m.

Comparative Example 2

Injection molding is performed using polyimide coated mold (A) having fine asperities on the surface. The weld line on the shaped part had a dent of no more than 1 μm and it is by no means noticeable; however, in the presence of a difference in the degree of dullness between the general portion and the weld portion 5 (the region extending form the weld portion to the resin flow end portion), the shaped part does not have a uniform dull surface. To state specifically, the weld portion 5 is blackish whereas the general portion 6 is whitish. FIGS. 17A, 17B and 17C shows surface asperity patterns: the surface asperity pattern of the polyimide coated mold is shown at FIG. 17A; the surface asperity pattern of the general portion of the shaped part is shown at FIG. 17B; and the surface asperity pattern of the weld portions 5 of the shaped part is shown at FIG. 17C. The general portion and weld portion 5 of the shaped part obviously have different surface asperity patterns. The dull surface of the weld portion 5 sustains a noticeable flaw at hardness 2B in a pencil scratch test.

Example 2

Figure 18:
FIG. 18 is a graph representing the surface asperity pattern of a shaped article in Example 2.
Figure 19:
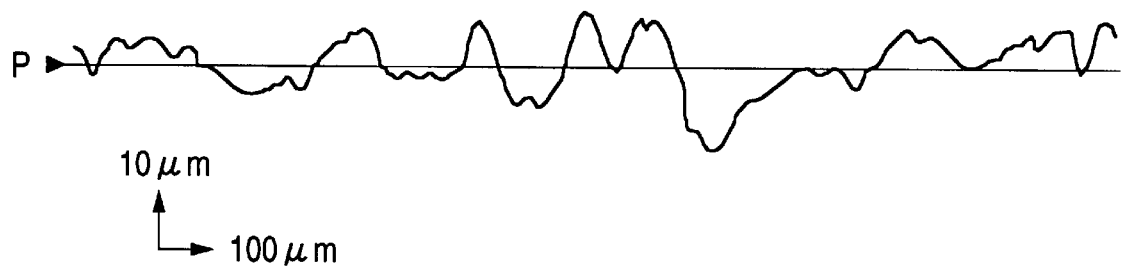
FIG. 19 is a graph representing the surface asperity pattern of another shaped article in Example 2.

Injection molding is performed using polyimide coated molds (C) and (D) each having fine asperities on the surface. Each of the shaped parts has a uniform degree of dullness in the general and weld portions; the gloss is 2% in both the general and weld portions for (C) and 11% in both the general and weld portions for (D). In both cases, the weld line has a dent of no more than 1 μm and it is by no means noticeable. In both cases, no visible flaws develop at hardness B in a pencil scratch test and the shaped parts are injection molded articles having a satisfactory uniform dull surface. FIGS. 18 and 19 show the surface asperity patterns of the shaped parts from molds (C) and (D). Their surface roughnesses are substantially the same as the surface roughnesses of molds (C) and (D). The surface roughness of the shaped part form mold (C) is: Ra, 1.2 μm; Rmax, 8.4 μm; Rz, 7.0 μm; S, 0.13 μm. The surface roughness of the shaped part from mold (D) is: Ra, 3.0 μm, Rmax, 28 μm, Rz, 18 μm; S, 0.19 mm.

Example 3

Injection molding is performed using embossed polyimide coated mold (E) to produce a shaped part having an embossed surface, in which the high spots are dull and the low spots are glossy. The high spots have 2% gloss and sustain no visible flaws at B in a pencil scratch test. The shaped part has a uniform degree of dullness in the general and weld portions. The weld line has a dent of no more than 1 μm and is hardly noticeable. The surface roughness of the high spots of the shaped part is substantially the same as the surface roughness of the low spots of mold (E).

Example 4

Injection molding is performed using polyimide coated mold (X) having a thin metal layer of fine asperities on the outermost surface. The shaped part has a uniform degree of dullness in the general and weld portions and the gloss is 2% in both the general and weld portions, with no visible flaws developing at B in a pencil scratch test. The weld line has a dent of no more than 1 μm and is hardly noticeable. The surface roughness of the high spots of the shaped part is substantially the same as the surface roughness of mold (X).

Example 5

Injection molding is performed using polyimide coated mold (Y) having an embossed thin metal layer on the outermost surface, thereby producing a shaped part having an embossed surface, in which the high spots are dull and the low spots are glossy. The high spots have 2% gloss and sustain no visible flaws at B in a pencil scratch test. The shaped part has a uniform degree of dullness in the general and weld portions. The weld line has a dent of no more than 1 μm and is hardly noticeable. The surface roughness of the high spots of the shaped part is substantially the same as the surface roughness of the lows pots of mold (Y).

Example 6

Injection molding is performed using polyimide coated mold (Z) having an embossed thin metal layer on the outermost surface, thereby producing a shaped part having an embossed surface, in which the high spots are dull and the low spots are glossy. The high spots have 2% gloss and sustain no visible flaws at B in a pencil scratch test. The shaped part has a uniform degree of dullness in the general and weld portions. The weld line has a dent of no more than 1 μm and is hardly noticeable. The surface roughness of the high spots of the shaped part is substantially the same as the surface roughness of the low spots of mold (Z).

INDUSTRIAL APPLICABILITY

The present invention enables the production of injection molding having a satisfactory dull surface with less noticeable weld lines. Such moldings have heretofore been produced by applying dull coatings onto shaped parts. However, destruction of the environment by the vapors of solvents in paints has recently been a great social concern and, in addition, the reduction of production cost is required. The molded article of the invention can be produced without post-molding paint application and yet it has practical utility, thereby maximizing the economic advantage of the invention.

We claim:

1. A method of shaping molded articles comprising the step of performing injection molding using a heat insulating layer coated mold, comprising:

a metallic main mold coated having a first inner surface coated with a heat-resistant polymer wherein said heat-resistant polymer is a heat insulating layer 0.05 to 1.0 mm thick having a second inner surface opposite to the metallic main mold, and wherein said heat-resistant polymer coated metallic main mold is coated with a heat insulating material made of a heat-resistant polymer incorporating 5 to 50 wt % of a fine powder made of inorganic matter having an average particle size of 0.001 to 50 μm, wherein said inorganic matter containing heat insulating material layer forms a third inner surface defining a die cavity; and the third inner surface has fine asperities having a center-line-average roughness (Ra) of 0.1 to 10 μm, a maximum height (Rmax) of 1 to 100 μm, a ten-point-average roughness (Rz) of 1 to 100 μm and an average spacing between local peaks (S) of 0.01 to 0.5 mm.

2. A shaping method according to claim 1, wherein the fine asperities on the third inner surface of the die have a center-line-average roughness (Ra) of 0.5 to 5 μm, a maximum height (Rmax) of 5 to 50 μm, a ten-point-average roughness (Rz) of 5 to 50 μm and an average spacing between local peaks (S) of 0.03 to 0.3 mm.

3. A shaping method according to claim 1, wherein a thin metal layer is provided on the third inner surface of the heat insulating layer in a thickness not greater than ⅕ of the thickness of said heat insulating layer.

4. A method of shaping molded articles comprising the step of performing injection molding using a heat insulating layer coated mold, comprising:

a metallic main mold having an inner surface coated with a heat insulating layer 0.05 to 1.0 mm thick made of a heat-resistant polymer having fine asperities on an innermost surface opposite to the metallic main mold;

wherein the fine asperities on the innermost surface are formed by sandblasting the innermost surface of the heat insulating layer, wherein the thus formed fine asperities on the innermost surface of the die have a center-line-average roughness (Ra) of 0.1 to 10 μm, a maximum height (Rmax) of 1 to 100 μm, a ten-point-average roughness (Rz) of 1 to 100 μm and an average spacing between local peaks (S) of 0.01 to 0.5 mm, said injection molding step comprising casting a heat-resistant polymer into the low spots of said sandblasted surface to adjust the roughness of the heat-resistant polymer.

5. A shaping method according to claim 4, wherein the fine asperities on the innermost surface of the die have a center-line-average roughness (Ra) of 0.5 to 5 μm, a maximum height (Rmax) of 5 to 50 μm, a ten-point-average roughness (Rz) of 5 to 50 μm and an average spacing between local peaks (S) of 0.03 to 0.3 mm.

6. A shaping method according to claim 4, wherein a thin metal layer is provided on the surface of the heat insulating layer in a thickness not greater than ⅕ of the thickness of said heat insulating layer.

7. A shaping method according to claim 4, wherein a thin metal layer is provided on the surface of the heat insulating layer in a thickness not greater than ⅕ of the thickness of said heat insulating layer, said metal layer being embossed to have high and low spots, and the low spots of the embossed surface occupy a larger area than the high spots.

* * * * *